US011026096B2

(12) United States Patent
Harada et al.

(10) Patent No.: US 11,026,096 B2
(45) Date of Patent: Jun. 1, 2021

(54) USER TERMINAL, RADIO BASE STATION AND RADIO COMMUNICATION METHOD

(71) Applicant: NTT DOCOMO, INC., Tokyo (JP)

(72) Inventors: Hiroki Harada, Tokyo (JP); Kazuki Takeda, Tokyo (JP); Satoshi Nagata, Tokyo (JP); Jing Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 275 days.

(21) Appl. No.: 15/770,445

(22) PCT Filed: Oct. 27, 2016

(86) PCT No.: PCT/JP2016/081848
§ 371 (c)(1),
(2) Date: Apr. 23, 2018

(87) PCT Pub. No.: WO2017/073651
PCT Pub. Date: May 4, 2017

(65) Prior Publication Data
US 2018/0317092 A1    Nov. 1, 2018

(30) Foreign Application Priority Data

Oct. 27, 2015   (JP) .................................. 2015-210954
Nov. 5, 2015   (JP) .............................. JP2015-217391

(51) Int. Cl.
*H04W 16/14*   (2009.01)
*H04L 27/00*   (2006.01)
(Continued)

(52) U.S. Cl.
CPC ........... *H04W 16/14* (2013.01); *H04L 5/0048* (2013.01); *H04L 5/0053* (2013.01);
(Continued)

(58) Field of Classification Search
CPC . H04W 16/14; H04W 72/0406; H04W 72/14; H04W 24/10; H04L 27/0006; H04L 5/0053; H04L 5/0048
See application file for complete search history.

(56) References Cited

U.S. PATENT DOCUMENTS 9,155,098 B2    10/2015   Geirhofer et al.
2012/0082152 A1*  4/2012   Baldemair ........ H04W 56/0015
                                                 370/350
(Continued)

FOREIGN PATENT DOCUMENTS

JP    2015517258 A    6/2015

OTHER PUBLICATIONS

Office Action issued in the counterpart Japanese Patent Application No. 2015-217391, dated Dec. 13, 2016 (11 pages).
(Continued)

*Primary Examiner* — Ivan O Latorre
(74) *Attorney, Agent, or Firm* — Osha Bergman Watanabe & Burton LLP

(57) ABSTRACT

The present invention is designed to carry out communication adequately in cells (for example, unlicensed bands) where listening is executed prior to transmission. According to one aspect of the present invention, a user terminal has a receiving section that receives common control information, via a downlink control channel, in an LAA SCell (License-Assisted Access Secondary Cell), and a control section that controls a communication process in the LAA SCell based on the common control information.

6 Claims, 17 Drawing Sheets

(51) Int. Cl.
  *H04L 5/00*    (2006.01)
  *H04W 72/14*   (2009.01)
  *H04W 72/04*   (2009.01)
  *H04W 24/10*   (2009.01)

(52) U.S. Cl.
  CPC ..... *H04L 27/0006* (2013.01); *H04W 72/0406* (2013.01); *H04W 72/14* (2013.01); *H04W 24/10* (2013.01)

(56) References Cited

U.S. PATENT DOCUMENTS

| | | | |
|---|---|---|---|
| 2015/0189574 | A1 | 7/2015 | Ng et al. |
| 2015/0365152 | A1* | 12/2015 | Frenne ............... G03G 15/0812 370/252 |
| 2016/0270091 | A1* | 9/2016 | Frenne ................. H04L 1/0035 |
| 2017/0048828 | A1* | 2/2017 | Um ....................... H04L 1/0061 |
| 2017/0117997 | A1* | 4/2017 | Park ..................... H04L 1/0026 |
| 2017/0208588 | A1* | 7/2017 | Park .................... H04L 27/2656 |
| 2018/0279144 | A1* | 9/2018 | Mukherjee ........... H04W 24/08 |

OTHER PUBLICATIONS

Office Action issued in the counterpart Japanese Patent Application No. 2015-217391, dated Jul. 11, 2017 (12 pages).
Extended European Search Report issued in counterpart European Patent Application No. 16859880.3, dated Oct. 9, 2018 (9 Pages).
Ericsson; "On Transmission Mode and Transmission Scheme support in LAA"; 3GPP TSG RAN WG1 Meeting #82bis R1-156045; Malmo, Sweden, Oct. 5-9, 2015 (3 Pages).
Ericsson; "Further discussion on support of CSI Measurement and Reporting for LAA"; 3GPP TSG RNA WG1 Meeting #80bis, R1-152011; Belgrade, Serbia; Apr. 20-24, 2015 (5 pages).
Alcatel-Lucent, et al.; "PDSCH and DCI Transmissions in LAA"; 3GPP TSG RAN WG1 Meeting #82bis, R1-155629; Malmö, Sweden; Oct. 5-9, 2015 (8 pages).
Sharp; "Consideration of CSI measurement and CSI reporting for LAA"; 3GPP TSG RAN WG1 Meeting #82bis, R1-155571; Malmö, Sweden; Oct. 5-9, 2015 (6 pages).
Motorola Mobility; "CSI measurement and reporting for LAA"; 3GPP TSG RAN WG1 #82bis, R1-155780; Malmö, Sweden; Oct. 5-9, 2015 (4 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
AT&T; "Drivers, Benefits and Challenges for LTE in Unlicensed Spectrum"; 3GPP TSG-RAN Meeting #62, RP-131701; Busan, Korea; Dec. 3-6, 2013 (3 pages).
International Search Report issued in PCT/JP2016/081848 dated Dec. 20, 2016 (2 pages).
Written Opinion issued in PCT/JP2016/081848 dated Dec. 20, 2016 (5 pages).
Office Action issued in European Application No. 16859880.3; dated Nov. 3, 2020 (8 pages).

* cited by examiner

CRS(1symbol)  Channel reservation
DRS(PSS/SSS/CRS/CSI-RS) w/o PDSCH
DRS(PSS/SSS/CRS/CSI-RS) w/ PDSCH CRS(1symbol)    Channel reservation
 PSS/SSS/CRS(4symbols)
 DRS(PSS/SSS/CRS/CSI-RS) w/o PDSCH
 DRS(PSS/SSS/CRS/CSI-RS) w/ PDSCH w/o partial starting TTI w/ partial starting TTI ▨ ENHANCED PCFICH   ▧ Channel reservation
▥ EXISTING PCFICH

USER TERMINAL, RADIO BASE STATION AND RADIO COMMUNICATION METHOD

TECHNICAL FIELD

The present invention relates to a user terminal, a radio base station and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1). Also, the specifications of LTE-A (also referred to as "LTE-advanced," "LTE Rel. 10," "LTE Rel. 11" or "LTE Rel. 12") have been drafted for further broadbandization and increased speed beyond LTE (also referred to as LTE Rel. 8 or 9), and successor systems of LTE (also referred to as, for example, "FRA" (Future Radio Access), "5G" (5th generation mobile communication system), "LTE Rel. 13" and so on) are under study.

The specifications of Rel. 8 to 12 LTE have been drafted assuming exclusive operations in frequency bands that are licensed to operators—that is, licensed bands. As licensed bands, for example, 800 MHz, 2 GHz, 1.7 GHz and 2 GHz are used.

In recent years, user traffic has been increasing steeply following the spread of high-performance user terminals (UE: User Equipment) such as smart-phones and tablets. Although more frequency bands need to be added to meet this increasing user traffic, licensed bands have limited spectra (licensed spectra).

Consequently, a study is in progress with Rel. 13 LTE to expand the frequencies of LTE systems by using bands of unlicensed spectra (also referred to as "unlicensed bands") that are available for use apart from licensed bands (see non-patent literature 2). For unlicensed bands, for example, the 2.4 GHz band and the 5 GHz band, where Wi-Fi (registered trademark) and Bluetooth (registered trademark) can be used, are under study for use.

To be more specific, with Rel. 13 LTE, a study is in progress to execute carrier aggregation (CA) between licensed bands and unlicensed bands. Communication that is carried out by using unlicensed bands with licensed bands like this is referred to as "LAA" (License-Assisted Access). Note that, in the future, dual connectivity (DC) between licensed bands and unlicensed bands and stand-alone in unlicensed bands may become the subject of study under LAA.

CITATION LIST

Non-Patent Literature

Non-Patent Literature 1: 3GPP TS 36. 300 "Evolved Universal Terrestrial Radio Access (E-UTRA) and Evolved Universal Terrestrial Radio Access Network (E-UTRAN); Overall Description; Stage 2"

Non-Patent Literature 2: AT&T, Drivers, Benefits and Challenges for LTE in Unlicensed Spectrum, 3GPP TSG-RAN Meeting #62 RP-131701

SUMMARY OF INVENTION

Technical Problem

Unlicensed band cells, in which, for example, pre-transmission listening is employed, are like to have different communication performance than licensed band cells. Consequently, even if the signaling of control information in licensed band cells is applied to unlicensed band cells on an as-is basis, it may not be possible to achieve synchronization, measure channel state information (CSI), demodulate a downlink shared channel (PDSCH: Physical Downlink Shared Channel), or perform carious communication processes such as rate matching adequately.

The present invention has been made in view of the above, and it is therefore an object of the present invention to provide a user terminal, a radio base station and a radio communication method, whereby communication processes can be performed adequately in cells where listening is executed prior to transmission (for example, unlicensed bands).

Solution to Problem

According to one aspect of the present invention, a user terminal has a user terminal has a receiving section that receives common control information, via a downlink control channel, in an LAA SCell (License-Assisted Access Secondary Cell), and a control section that controls a communication process in the LAA SCell based on the common control information.

Advantageous Effects of Invention

According to the present invention, communication processes can be performed adequately in cells where listening is executed prior to transmission (for example, unlicensed bands).

DESCRIPTION OF EMBODIMENTS

Figure 1A:
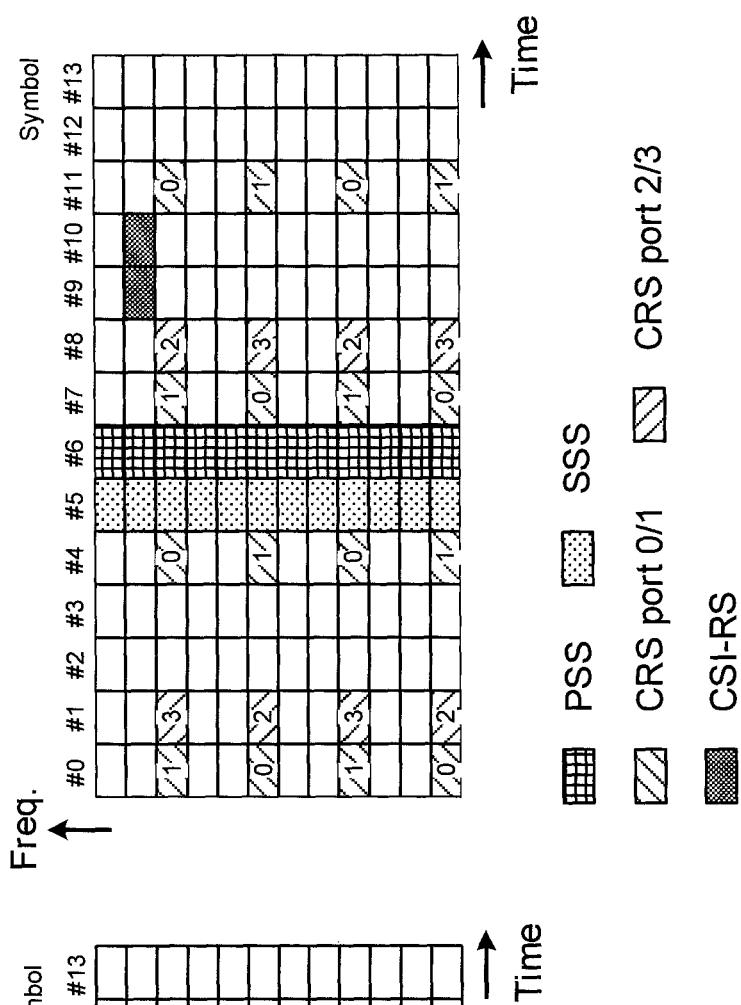
FIGS. 1A and 1B provide diagrams to show examples of LAA DRS configurations.

In systems (for example, LAA systems) that run LTE/LTE-A in unlicensed bands, interference control functionality is likely to be necessary in order to allow co-presence with other operators' LTE, Wi-Fi, or other different systems. Note that, systems that run LTE/LTE-A in unlicensed bands may be collectively referred to as "LAA," "LAA-LTE," "LTE-U," "U-LTE" and so on, regardless of whether the mode of operation is CA, DC or SA.

Generally speaking, when a transmission point (for example, a radio base station (eNB), a user terminal (UE) and so on) that communicates by using a carrier (which may also be referred to as a "carrier frequency," or simply a "frequency") of an unlicensed band detects another entity (for example, another user terminal) that is communicating in this unlicensed band carrier, the transmission point is disallowed to make transmission in this carrier.

So, the transmission point executes listening (LBT) at a timing that is a predetermined period ahead of a transmission timing. To be more specific, by executing LBT, the transmission point searches the whole of the target carrier band (for example, one component carrier (CC)) at a timing that is a predetermined period ahead of a transmission timing, and checks whether or not other devices (for example, radio base stations, user terminals, Wi-Fi devices and so on) are communicating in this carrier band.

Note that, in the present description, "listening" refers to the operation which a given transmission point (for example, a radio base station, a user terminal, etc.) performs before transmitting signals in order to check whether or not signals to exceed a predetermined level (for example, predetermined power) are being transmitted from other transmission points. Also, this "listening" performed by radio base stations and/or user terminals may be referred to as "LBT," "CCA," carrier sensing and so on.

If it is confirmed that no other devices are communicating, the transmission point carries out transmission using this carrier. If the received power measured during LBT (the received signal power during the LBT period) is equal to or lower than a predetermined threshold, the transmission point judges that the channel is in the idle state ($LBT_{idle}$), and carries out transmission. When a "channel is in the idle state," this means that, in other words, the channel is not occupied by a specific system, and it is equally possible to say that a channel is "idle," a channel is "clear," a channel is "free," and so on.

On the other hand, if only just a portion of the target carrier band is detected to be used by another device, the transmission point stops its transmission. For example, if the transmission point detects that the received power of a signal from another device entering this band exceeds a predetermined threshold, the transmission point judges that the channel is in the busy state ($LBT_{busy}$), and makes no transmission. In the event $LBT_{busy}$ is yielded, LBT is carried out again with respect to this channel, and the channel becomes available for use only after it is confirmed that the channel is in the idle state. Note that the method of judging whether a channel is in the idle state/busy state based on LBT is by no means limited to this.

As LBT mechanisms (schemes), FBE (Frame Based Equipment) and LBE (Load Based Equipment) are currently under study. Differences between these include the frame configurations to use for transmission/receipt, the channel-occupying time, and so on. In FBE, the LBT-related transmitting/receiving configurations have fixed timings. Also, in LBE, the LBT-related transmitting/receiving configurations are not fixed in the time direction, and LBT is carried out on an as-needed basis.

To be more specific, FBE has a fixed frame cycle, and is a mechanism of carrying out transmission if the result of executing carrier sensing for a certain period (which may be referred to as "LBT duration" and so on) in a predetermined frame shows that a channel is available for use, and not making transmission but waiting until the next carrier sensing timing if no channel is available.

On the other hand, LBE refers to a mechanism for implementing the ECCA (Extended CCA) procedure of extending the duration of carrier sensing when the result of carrier sensing (initial CCA) shows that no channel is available for use, and continuing executing carrier sensing until a channel is available. In LBE, random backoff is required to adequately avoid contention.

Note that the duration of carrier sensing (also referred to as the "carrier sensing period") refers to the time (for example, the duration of one symbol) it takes to gain one LBT result by performing listening and/or other processes and deciding whether or not a channel can be used.

A transmission point can transmit a predetermined signal (for example, a channel reservation signal) based on the result of LBT. Here, the result of LBT refers to information about the state of channel availability (for example, "$LBT_{idle}$," "$LBT_{busy}$," etc.), which is acquired by LBT in carriers where LBT is configured.

Also, when a transmission point starts transmission when the LBT result shows the idle state ($LBT_{idle}$), the transmission point can skip LBT and carry out transmission for a predetermined period (for example, for 10 to 13 ms). This transmission is also referred to as "burst transmission," "burst" and so on.

As described above, by introducing interference control for use within the same frequency that is based on LBT mechanisms to transmission points in LAA systems, it is possible to prevent interference between LAA and Wi-Fi, interference between LAA systems and so on. Furthermore, even when transmission points are controlled independently per operator that runs an LAA system, it is possible to reduce interference without learning the details of each operator's control, by means of LBT.

Now, in LAA systems, to configure and/or reconfigure unlicensed band SCells (Secondary Cells) in user terminals, a user terminal has to detect SCells that are present in the surroundings by means of RRM (Radio Resource Management) measurements, measure their received quality, and then send a report to the network. The signal for RRM measurements in LAA is under study based on the discovery signal (DS) that is stipulated in Rel. 12.

Note that the signal for RRM measurements in LAA may be referred to as the "detection/measurement signal," the "discovery reference signal" (DRS), the "discovery signal" (DS), the "LAA DRS," the "LAA DS," and so on. Also, an unlicensed band SCell may be referred to as, for example, an "LAA SCell."

Similar to the Rel. 12 DS, a study is in progress to constitute the LAA DRS by including at least one of a synchronization signal (PSS (Primary Synchronization Signal)/SSS (Secondary Synchronization Signal)), a cell-specific reference signal (CRS) and a channel state information reference signal (CSI-RS).

Also, the network (for example, radio base stations) can configure the DMTC (Discovery Measurement Timing Configuration) for LAA DRSs in user terminals on a per frequency basis. The DMTC contains information about the transmission cycle of DRSs (which may be also referred to as "DMTC periodicity" and so on), the DRS measurement timing offset and so on.

DRSs are transmitted in the DMTC duration, per DMTC periodicity. Here, according to Rel. 12, the DMTC duration is fixed to 6 ms. Also, the length of the DRS (which may be also referred to as the "DRS occasion," the "DS occasion," the "DRS burst," the "DS burst" and so on) that is transmitted in the DMTC duration is between 1 ms and 5 ms. The LAA DS may be configured the same as in Rel. 12, or may be configured differently. For example, taking the time of LBT into account, the DRS occasion may be made 1 ms or shorter, or may be made 1 ms or greater.

In an unlicensed band cell, a radio base station executes listening (LBT) before transmitting the LAA DRS, and transmits the LAA DRS when $LBT_{idle}$ is yielded. A user terminal learns the timings and the cycle of DRS occasions based on the DMTC reported from the network, and detects and/or measures LAA DRSs. Furthermore, a study is in progress to make CSI measurements in DRS occasions by using DRSs, in addition to RRM measurements. For example, it may be possible to make CSI measurements by using CRSs, CSI-RSs and so on included in DRSs, in timings other than the CSI measurement timings provided in a predetermined cycle (which is, for example, 5 ms, 10 ms, etc.).

Figure 1B:
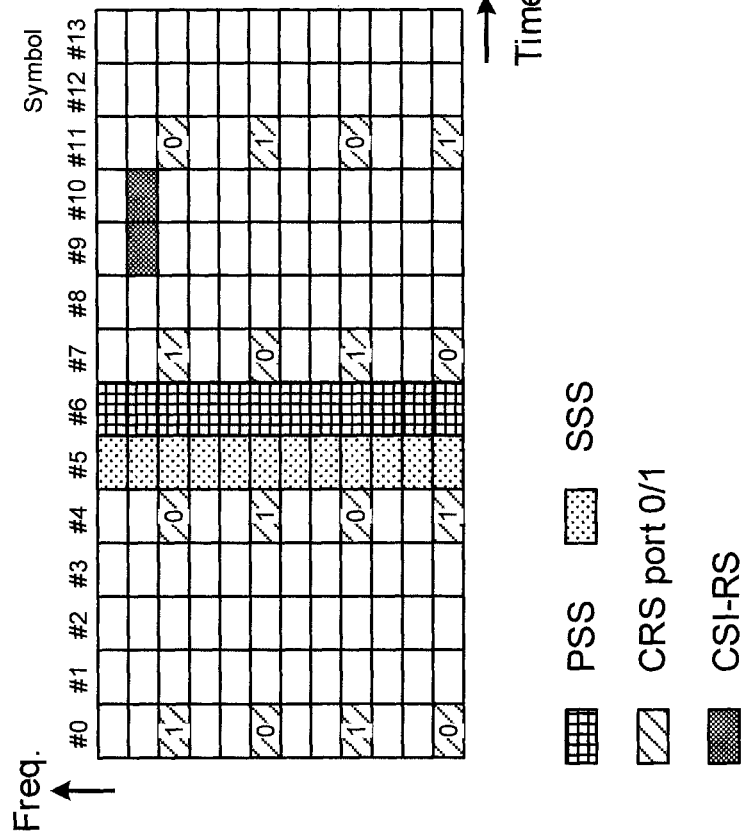

FIG. 1 provide diagrams that show examples of LAA DRS configurations. FIG. 1A shows an example configuration for use when CRSs are transmitted by using two antenna ports. In FIG. 1A, an LAA DRS is formed by including CRSs (port 0/1) in symbols #0, #4, #7 and #11, a PSS in symbol #6 and an SSS in symbol #5. The LAA DRS may also be formed to include CSI-RSs in symbols #9 and #10. FIG. 1B shows an example configuration for use when CRSs are transmitted by using four antenna ports. The LAA DRS of FIG. 1B is formed to include CRSs (port 2/3) in symbols #1 and #8, on top of the configuration of FIG. 1A.

Note that, in FIGS. 1A and 1B, a "CRS port X" indicates a CRS that is transmitted using an antenna port X. Also, the LAA DRS configurations shown in FIGS. 1A and 1B are simply examples, and these are by no means limiting. An LAA DRS has only to be formed by including at least one of a synchronization signal (PSS/SSS), a CRS and a CSI-RS. Also, the locations (for example, resource elements) to allocate the PSS/SSS, CRSs and CSI-RSs may be the same as in existing systems (for example, Rel. 12), or may be different. Furthermore, an LAA DRS may be formed by using 12 symbols of the Rel. 12 DRS (for example, symbols #0 to #11).

As described above, unlicensed band cells, in which, for example, pre-transmission listening is employed, are likely to show different communication performance than licensed band cells. Consequently, even if the signaling of control information in licensed band cells is applied to unlicensed band cells on an as-is basis, it may not be possible to achieve synchronization, measure CSI, demodulate the PDSCH, or perform various communication processes such as rate matching adequately.

So, the present inventors have come up with idea of enabling adequate communication processes in unlicensed band cells by signaling control information that takes into consideration the communication performance of unlicensed bands, which are different from licensed band cells.

Now, an embodiment of the present invention will be described below in detail with reference to the accompanying drawings. Although the following embodiment will be described assuming that a carrier (cell) where listening is configured is an unlicensed band, this is by no means limiting. The present embodiment is applicable to any carriers (or cells) in which listening is configured, regardless of whether this carrier is a licensed band or an unlicensed band.

Also, although a case will be assumed with the present embodiment where CA or DC is applied between a carrier in which listening is not configured (for example, the primary cell (PCell) of a licensed band) and a carrier in which listening is configured (for example, a secondary cell (SCell) of an unlicensed band), this is by no means limiting. For example, the present embodiment is applicable to cases where a user terminal connects with a carrier (cell) in which listening is configured in stand-alone.

Also, although the present embodiment will be described to signal control information, which will be described later, in the physical later, this is by no means limiting. At least one of the control information described below may be sent via higher layer signaling (for example, RRC (Radio Resource Control) signaling, system information, etc.).

(Contents of Signaling)

The control information that is signaled in an unlicensed band cell (a cell in which listening is configured prior to transmission) in the present embodiment will be described. Common control information, which is signaled to the user terminal in the above cell in common may include at least one of the CRS information, the CSI-RS/IM information, the DRS information and the burst information described below. Furthermore, the unique control information (UE-specific control information) that is signaled to each separate user terminal in the cell may include at least one of the end subframe information and the DRS information described below.

(1) CRS Information

The CRS information is information about the number of OFDM (Orthogonal Frequency-Division Multiplexing) symbols to which CRSs are allocated in subframes. For example, the CRS information may be a bit value (for example, one bit) that indicates whether CRSs are allocated to one or two OFDM symbols in a subframe (or whether CRSs are allocated to four or six OFDM symbols).

Generally speaking, in one subframe, CRSs are allocated to four OFDM symbols (for example, OFDM symbols #0, #4, #7 and #11 in FIG. 1A) when two antenna ports are used, or allocated to six OFDM symbols (for example, OFDM symbols #0, #1, #4, #7, #8, and #11 in FIG. 1B) when four antenna ports are used.

By contrast with this, there is an ongoing study to introduce a subframe in which CRSs are allocated to one OFDM symbol (for example, the top OFDM symbol alone) when two antenna ports are used, or allocated to two OFDM symbols (for example, the top and second OFDM symbols alone) when four antenna ports are used. By introducing this subframe, it is possible to reduce the overhead of CRSs in transmission mode to perform demodulation by using demodulation reference signals (DMRSs: DeModulation Reference Signals).

Now, in an unlicensed band cell, the radio base station does not make downlink transmission when the result of listening shows the busy state, and therefore a user terminal needs to judge whether or not downlink transmission is made, in each subframe. Consequently, when the user terminal detects CRSs (CRS port 0 and 1) bearing the cell ID of the unlicensed band cell in the first OFDM symbol in a subframe, the user terminal judges that downlink transmission is made (for example, at least one of a PSS, an SSS, a CSI-RS and a PDSCH is transmitted) in this subframe.

However, it is likely that, based on the CRS detection result in the first OFDM symbol of a subframe alone, whether this subframe is a subframe to allocate CRS to one or two OFDM symbols or a subframe to allocate CRSs to four or six OFDM symbols cannot be judged. As a result of this, there is a threat that synchronization, CRS-based CSI measurements, PDSCH rate matching cannot be carried out adequately.

So, according to the present embodiment, the CRS information to indicate whether or not CRSs are allocated to one or two OFDM symbols in a subframe (or whether or not CRSs are allocated to four or six OFDM symbols in a subframe) may be signaled.

The CRS information is expected to be used for synchronization, CSI measurements, rate matching and so on, and therefore may be signaled to the user terminals in a cell in common.

(2) CSI-RS/IM Information

The CSI-RS/IM information is information about the allocation of non-zero-power CSI-RSs (CSI-RSs) and/or zero-power CSI-RSs (CSI-IMs (Interference Measurements)) in subframes. For example, the CSI-RS information may be a bit value (for example, one bit) that indicates the presence/absence of non-zero-power CSI-RS and/or zero-power CSI-RSs (hereinafter abbreviated as "CSI-RSs/IMs") in a subframe.

Figure 2:
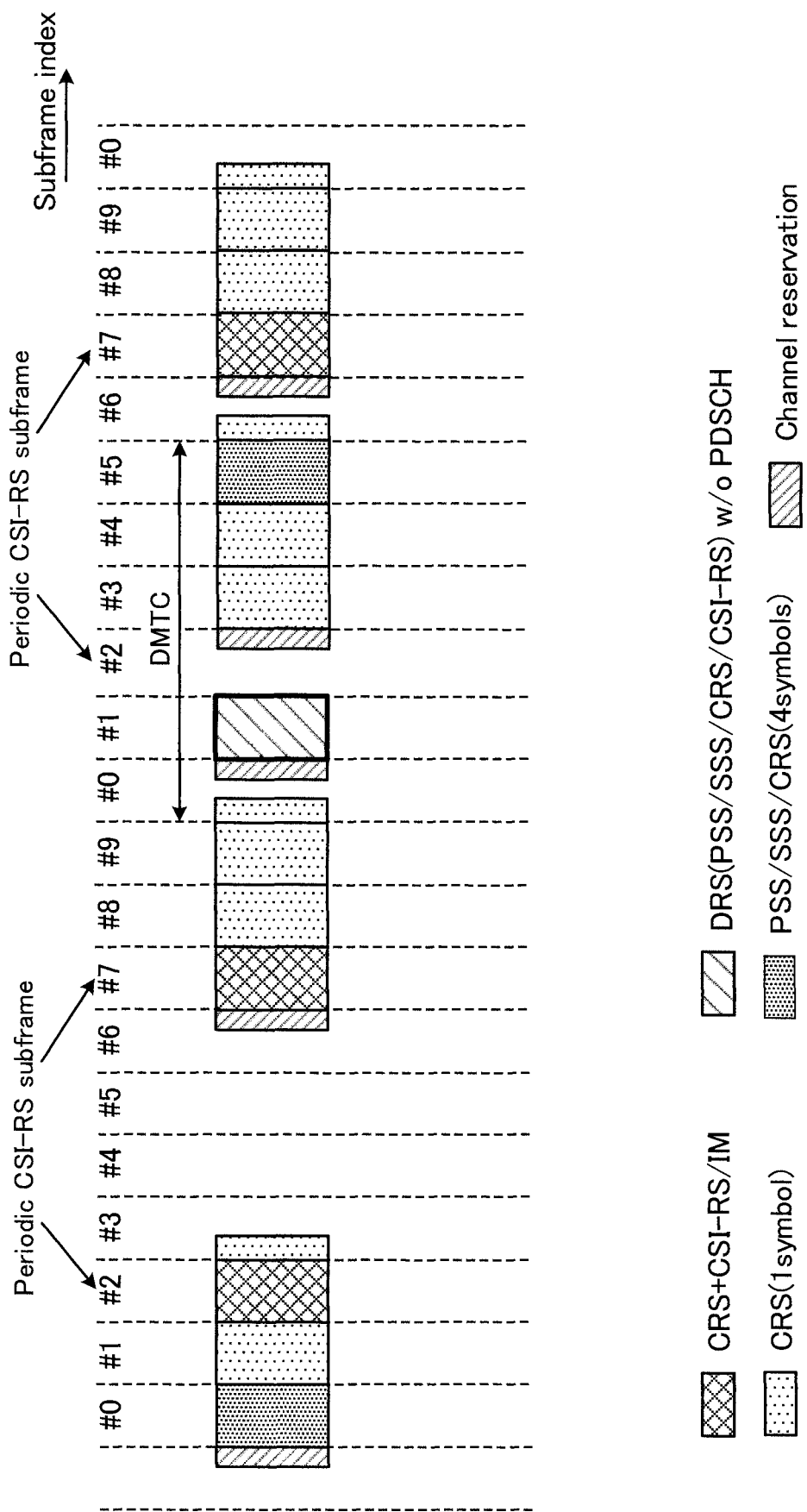
FIG. 2 is a diagram to explain CSI-RS/IM information according to the present embodiment.

In existing systems (for example, Rel. 12), CSI-RSs/IMs, which are used in CSI measurements, are allocated to subframes of a predetermined cycle (which is, for example, a cycle of 5 ms, 10 ms, etc.), which is configured by higher layer signaling. Furthermore, in unlicensed band cells, a study is in progress to allocate CSI-RSs/IMs for CSI measurements to subframes where DRSs are allocated (hereinafter abbreviated as "DRS subframes"), in addition to subframes of a predetermined cycle. Consequently, as shown in FIG. 2, when subframes #2 and #7 of a predetermined cycle where CSI-RSs/IMs are allocated and DRS subframe #1 in DMTC do not match, a user terminal is expected to be capable of judging whether or not to make a CSI measurement in this DRS subframe.

So, with the present embodiment, CSI-RS/IM information to indicate whether or not CSI-RSs/IMs for CSI measurements are allocated in subframes may be signaled. By this means, when, as shown in FIG. 2, when the CSI-RS/IM information that is signaled in DRS subframe #1 indicates CSI-RS/IM allocation, a user terminal can judge that a CSI measurement is made in DRS subframe #1.

The CSI-RS/IM information is expected to be used by both user terminals for which PDSCHs are scheduled and user terminals for which PDSCHs are not scheduled, and therefore may be signaled to the user terminals in a cell in common.

(3) DRS Information

The DRS information is information about the allocation of DRSs in subframes. For example, the DRS information may be a bit value (for example, one bit) that indicates the presence/absence of DRSs in subframes.

As described above, in unlicensed band cells, even when a subframe of a predetermined cycle (for example, a cycle of 5 ms, 10 ms, etc.) that is configured by higher layer signaling and a DRS subframe do not match, CSI-RSs/IMs for CSI measurements can be allocated in this DRS subframe. In this case, if a subframe is a DRS subframe, a user terminal can judge that a CSI measurement is made. However, it is possible that the user terminal fails to identify DRS subframes in the DMTC.

Figure 3A:
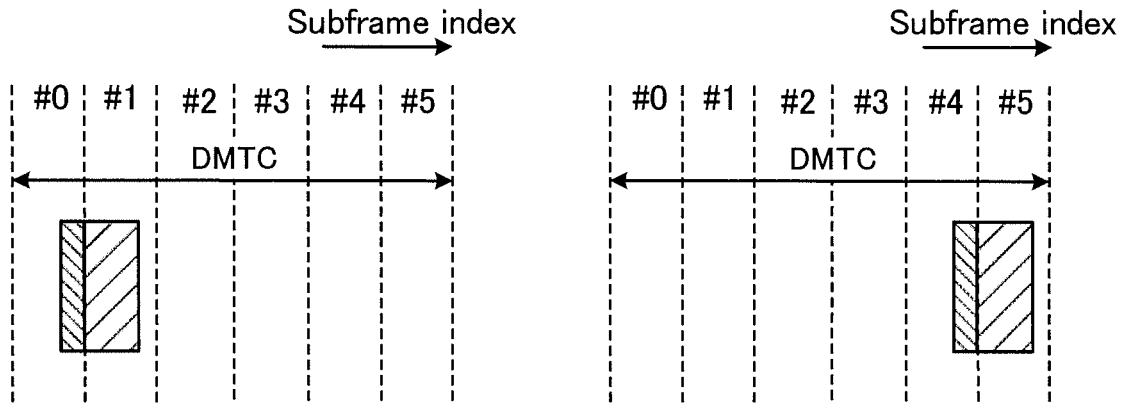
FIGS. 3A to 3C provide diagrams to show examples of DRS subframe identification according to the present embodiment.
Figure 3B:
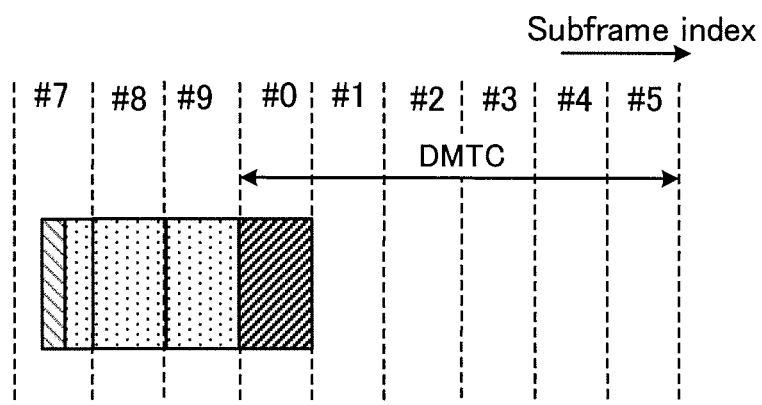
Figure 3C:
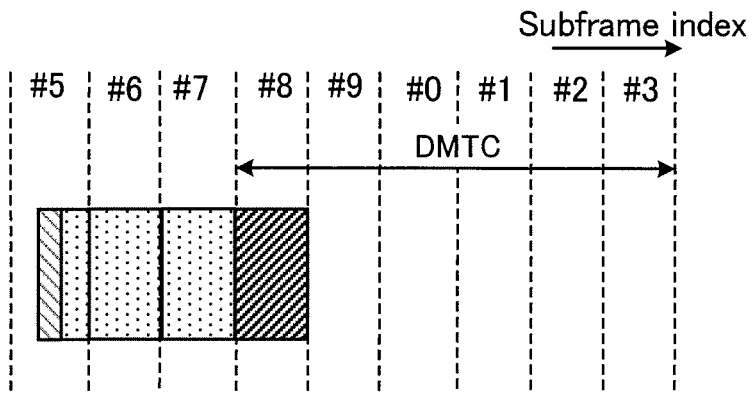

Now, examples of identification of DRS subframes will be described with reference to FIGS. 3 and 4. FIG. 3A shows a case where a DRS alone is transmitted in one subframe in the DMTC (for example, in FIG. 3A, subframe #1 or #5). FIG. 3B shows case where a DRS and a PDSCH are transmitted in subframe #0 in the DMTC. FIG. 3C shows a case where a DRS and a PDSCH are transmitted in subframe #8, apart from subframes #0 and #5, in the DMTC. In the cases shown in FIGS. 3A to 3C, only one subframe in the DMTC includes a PSS, an SSS and a CRS, so that this subframe can be identified as a DRS subframe.

Figure 4A:
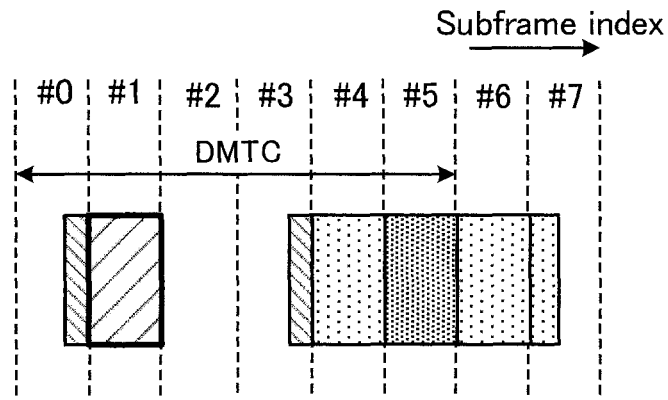
FIGS. 4A and 4B provide diagrams to explain DRS information according to the present embodiment.
Figure 4B:
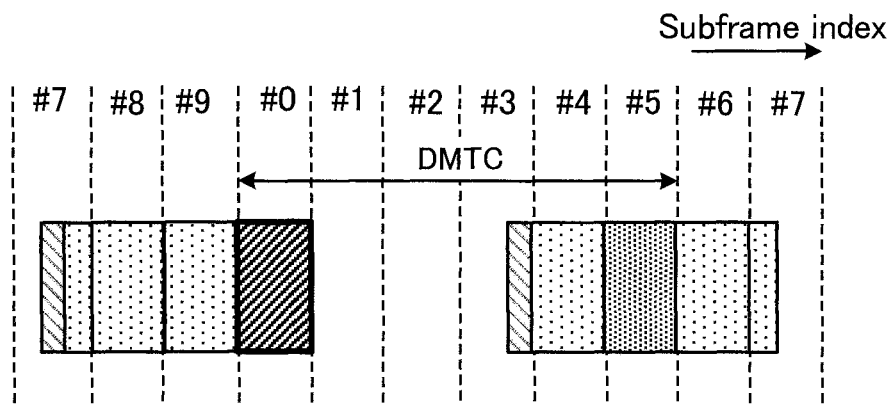
Figure 4B:
Figure 4B:
Figure 4B:
Figure 4B:
Figure 4B:

As shown in FIGS. 4A and 4B, when a DRS subframe and a normal subframe #0 and/or #5 including a PSS, an SSS and CRSs are co-present in a DMTC, there is a threat that a user terminal is unable to identify between subframe #0 or/and #5 and the DRS subframe.

For example, in FIG. 4A, a DRS is allocated in subframe #1 in the DMTC, and an existing PSS, SSS and CRSs are allocated in subframe #5. Here, the DRS is formed by including a PSS, an SSS and CRSs, as shown in FIGS. 1A and 1B. Consequently, it may be possible that a user terminal fails to distinguish between subframe #1, which is a DRS subframe, and subframe #5, which is not a DRS subframe but which nevertheless includes a PSS, an SSS and CRSs, in the DMTC. Similarly, in FIG. 4B, the user terminal may fail to distinguish between subframe #0, which is a DRS subframe, and subframe #5, which is not a DRS subframe but which nevertheless includes a PSS, an SSS and CRSs, in the DMTC.

So, with the present embodiment, DRS information to indicate whether or not a DRS is allocated in a subframe may be signaled. When DRS information to indicate that a DRS is allocated in a subframe is provided, the user terminal can judge that this subframe is a DRS subframe, and perform a CSI measurement in this DRS subframe. Also, the user terminal can detect, based on the DRS information, whether or not a DRS is allocated in a subframe in which a PDSCH is allocated, and therefore can execute rate matching adequately.

The DRS information is expected to be used instead of the above-described CSI-RS/IM information, and therefore may be signaled to the user terminals in a cell in common. Note that, when CSI-RSs for RRM measurements and/or CSI measurements are configured for a user terminal and the user terminal assumes that the first subframe that is detected to include a PSS, an SSS and CRSs in a DMTC (for example, subframe #1 in FIG. 4A and subframe #0 in FIG. 4B) is a DRS subframe to include CSI-RSs for RRM measurements and/or CSI measurements, common signaling of DRS information is not necessary.

Also, since the DRS information is likely to be used for PDSCH rate matching, the DRS information may be sent to user terminals where PDSCHs are scheduled, via UE-specific signaling.

(4) Burst Information

The burst information is information about the burst where a subframe belongs. To be more specific, the burst information may be information to indicate whether a subframe belongs to the same burst with other subframes. For example, the burst information may be bit values that indicate how many subframes the same burst lasts from the current subframe (for example, four bits if the maximum burst length is 10 ms or 13 ms), or may be bit values (for example, one or two bits) that indicate the index of the burst.

In an unlicensed band cell, a user terminal can assume that the transmission power of CRSs and/or CSI-RSs is fixed between subframes belonging to the same burst, so that the user terminal can find an average of CSI measurement results based on CRSs or CSI-RSs. Meanwhile, the user terminal should not assume that the transmission power of CRSs and/or CSI-RSs is fixed between subframes belonging to different bursts (and should assume that the transmission power changes), and therefore should not find an average of CRS-based or CSI-RS-based CSI measurement results.

Figure 5A:
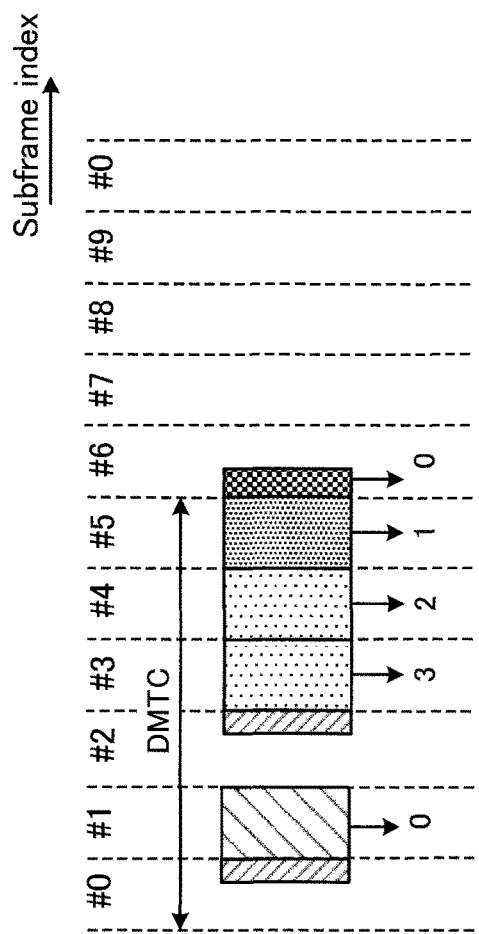
FIGS. 5A and 5B provide diagrams to explain burst information according to the present embodiment.
Figure 5B:
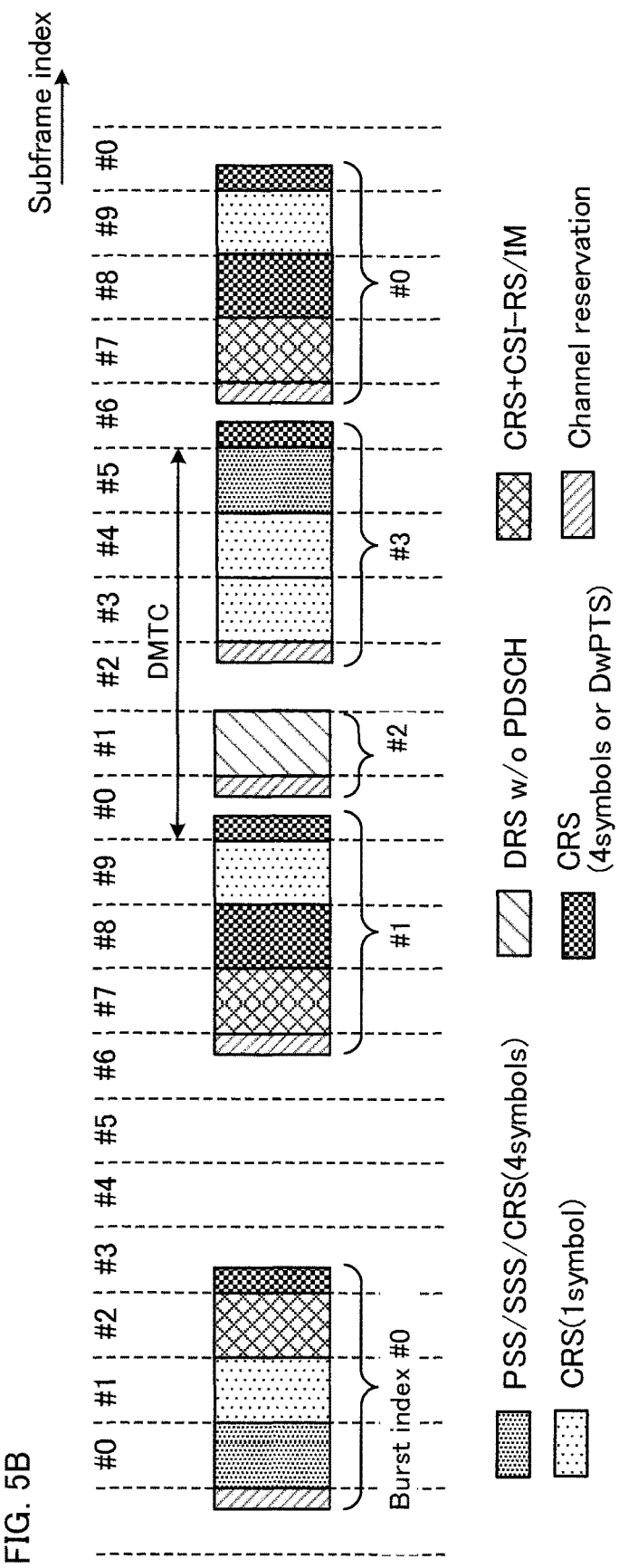

So, according to the present embodiment, by signaling the above-described burst information, it is possible to prevent CSI measurement results from being averaged between subframes belonging to different bursts. Now, the burst information will be described below in detail with reference to FIG. 5A and FIG. 5B. In FIG. 5A, the burst information to show how many subframes, starting from the current subframe, the same burst will last is used. In FIG. 5B, the burst information to indicate the burst index is used.

Referring to FIG. 5A, in subframe #1, which constitutes the first burst from the left, the burst information to indicate the number of subframes in which the same burst will last, "0," is signaled. Also, in subframe #3, #4, #5 and #6, which constitute the next burst, the burst information to show the numbers of subframes "3," "2," "1" and "0," each showing the number of subframes in which the same will last burst, is signaled. In FIG. 5A, the user terminal can identify the subframe where the burst ends based on the burst information, so that it is possible to prevent CSI measurement results from being averaged between subframes belonging to the current burst and the next burst.

In FIG. 5B, in subframes #0 to #3 constituting the first burst from the left, the burst information to indicate burst index #0 is signaled. In subframes #7 to #0 constituting a second burst, the burst information to indicate the burst index #1 is signaled. The burst information to indicate burst index #2 is signaled in subframe #1 constituting a third burst, the burst information to indicate burst index #3 is signaled in subframes #3 to #6 constituting a fourth burst, and the burst information to indicate burst index #0 is signaled in subframes #7 to #0 constituting a fifth burst.

In this way, in FIG. 5B, burst information to indicate a burst index is signaled in subframes constituting each burst. The user terminal can identify whether or not subframes belong to the same burst based on based on burst indices, so that it is possible to prevent CSI measurement results from being averaged between subframes belonging to different bursts.

Furthermore, in FIG. 5B, two-bit burst indices are used, there is a time interval of 13 ms between bursts to which the same burst index #0 is assigned (that is, between the first and fifth bursts from the left). Assuming that maximum burst length is 10 ms or 13 ms, there is little likelihood that a user terminal misidentifies subframes in the first and the fifth burst as subframes belonging to the same burst. In this way, by increasing the number of burst index bits, it is possible to prevent misidentification between bursts where the same burst index is assigned. Note that, from the burst of reducing overhead, it is equally possible to one-bit burst indices.

The burst information is expected to be used in CSI measurements, and therefore may be signaled to the user terminals in a cell in common.

(5) Last Subframe Information

The end subframe information is information about the last subframe (also referred to as "end subframe") in a burst. For example, the end subframe information may be bit values that indicate the number of OFDM symbols used in the last subframe of a burst (for example, three bits when representing eight patterns of last subframe configurations).

In an unlicensed band cell, PDSCHs (transport blocks) may be mapped to all the OFDM symbols or part of the OFDM symbols in the last subframe of a burst. Note that, as part of the OFDM symbols, for example, a DwPTS (Downlink Pilot Time Slot) configuration (six or ten OFDM symbols, for example) can be used. In this way, when the number of OFDM symbols in the last subframe of a burst can be changed on a dynamic basis, a user terminal needs to know the number of OFDM symbols in order to demodulate the PDSCHs.

So, according to the present embodiment, end subframe information to indicate the number of OFDM symbols used in the last subframe of a burst may be signaled. The user terminal demodulates the PDSCHs mapped to the last subframe based on the number of OFDM symbols which the end subframe information shows.

The end subframe information is expected to the used for PDSCH demodulation, and therefore may be signaled, individually, to PDSCH—scheduled user terminals.

Also, according to the present embodiment, the end subframe information may be signaled to the user terminals in a cell in common.

When a user terminal detects CRSs (CRS port 0 and 1) and/or a PDCCH (Physical Downlink Control Channel) bearing an unlicensed band cell's cell ID in the first OFDM symbol of a subframe, the user terminal can judge that downlink transmission takes place in this subframe. Meanwhile, when the last subframe of a burst is constituted by part of the OFDM symbols, the signal configuration may be different from that of a normal subframe that is formed by including all the OFDM symbols. For example, when the last subframe is formed with part of the OFDM symbols, it might occur that at least one of a PSS, an SSS and CSI-RSs/IMs is not allocated to the last subframe. Consequently, there is a threat that the user terminal is unable to identify the signal configuration in the last subframe, and unable to perform RRM measurements, CSI measurements and/or PDSCH rate matching adequately.

So, with the present embodiment, the end subframe information may be signaled to the user terminals in a cell in common. A user terminal identifies the signal configuration in the last subframe in a burst based on the above-described end subframe information, and, based on this identification result, carries out at least one of an RRM measurement, a CSI measurement and PDSCH rate matching in the last subframe of the burst.

To be more specific, the user terminal may judge whether or not a PSS/SSS are allocated in subframes #0 and #5, where a PSS/SSS are normally allocated, based on the number of OFDM symbols shown by the end subframe information.

For example, when, in subframe #0 or #5, the number of OFDM symbols shown by the end subframe information is less than a predetermined number, the user terminal may assume that subframe #0 or #5 does not include a PSS/SSS. Here, the predetermined number may be, for example, fourteen or seven, if normal CPs (Cyclic Prefixes) are used.

Also, the user terminal can identify whether or not CSI-RSs/IMs are allocated in a subframe having a predetermined cycle (for example, a cycle of 5 ms or 10 ms) that is configured by higher layer signaling, based on the number of OFDM symbols shown by the end subframe information.

For example, when, in the above-noted subframe of a predetermined cycle, the number of OFDM symbols shown by the end subframe information is less than a predetermined number, the user terminal may assume that this subframe does not include CSI-RSs/IMs. Here, the predetermined number may be, for example, fourteen or eleven if normal CPs (Cyclic Prefixes) are used.

Furthermore, in the above-noted subframe of a predetermined cycle, the user terminal may identify whether or not CSI-RSs/IMs are allocated in this subframe, based on the number of OFDM symbols shown by the end subframe information, and CSI-RS configurations reported by higher layer signaling. Here, the CSI-RS configurations refer to information that shows the locations where CSI-RSs/IMs are allocated, and are reported to the user terminal 20 via higher layer signaling.

Figure 17A:
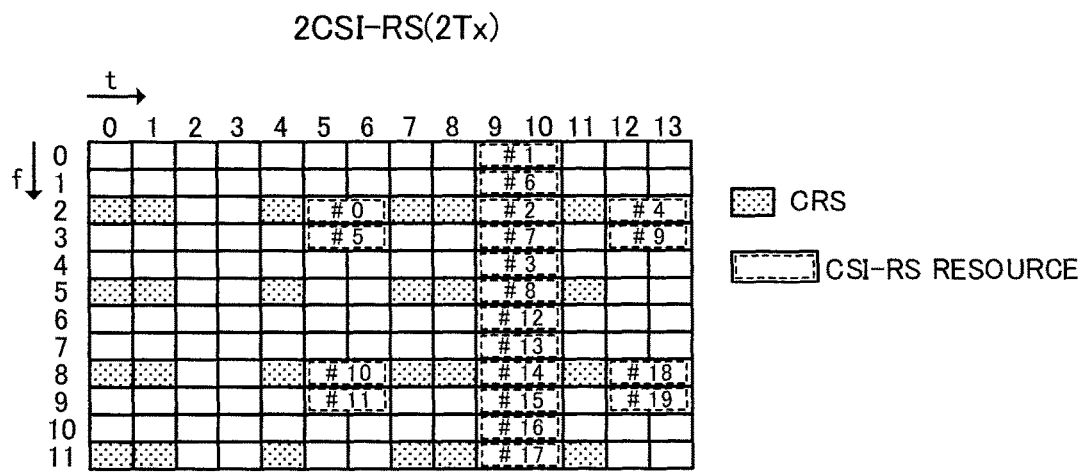
FIGS. 17A and 17B provide diagrams to show examples of CSI-RS configurations according to the present embodiment.
Figure 17B:
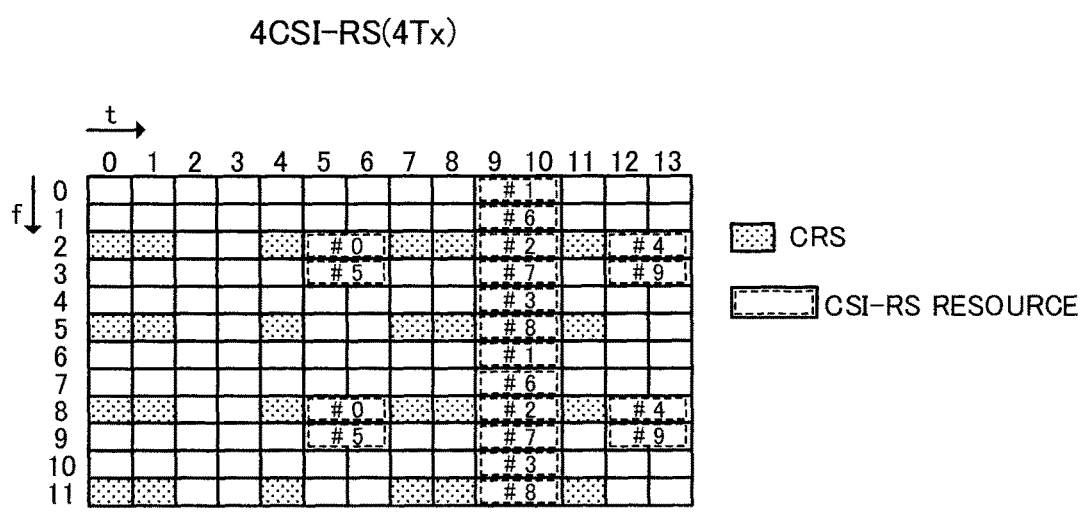

FIG. 17 provide diagrams to show examples of CSI-RS configurations. When CSI-RSs of two antenna ports are used, as shown in FIG. 17A, CSI-RS configurations #0 to #19 specify the locations where CSI-RSs/IMs are allocated. Furthermore, when CSI-RSs of four antenna ports are used, as shown in FIG. 17B, CSI-RS configurations #0 to #9 specify the locations where CSI-RSs/IMs are allocated.

When, in the above-noted subframe of a predetermined cycle, the number of OFDM symbols which the end subframe information shows is equal to or greater than 11 and less than 14, the user terminal may assume that CSI-RSs/IMs are not included in this subframe if OFDM symbols #12 and #13 are locations where CSI-RSs/IMs are allocated (when, in FIG. 17A, one of CSI-RS configurations #4, #9, #18 and #19 is configured, and/or when, in FIG. 17B, CSI-RS configuration #4 or #9 is configured).

By contrast with this, even when, in the above-noted subframe of a predetermined cycle, the number of OFDM symbols which the end subframe information shows is equal to or greater than 11 and less than 14, the user terminal can assume that CSI-RSs/IMs are included in this subframe if OFDM symbols #5 and #6 or OFDM symbols #9 and #10 are locations where CSI-RSs/IMs are allocated (when, in FIG. 17A, CSI-RS configurations #0 to #3, #5 to #8, or #10 to #17 are configured, and/or when, in FIG. 17B, CSI-RS configurations #0 to #3 or #5 to #8 are configured).

Furthermore, when, in the above-noted subframe of a predetermined cycle, the number of OFDM symbols which the end subframe information shows is equal to or greater than 7 and less than 11, the user terminal may assume that CSI-RSs/IMs are not included in this subframe if OFDM symbols #9 and #10 or OFDM symbols #12 and #13 are locations where CSI-RSs/IMs are allocated (when, in FIG. 17A, CSI-RS configurations #1 to #4, #6 to #9 or #12 to #19 are configured, and/or when, in FIG. 17B, CSI-RS configurations #1 to #4 or #6 to #9 are configured).

Meanwhile, even when, in the above-noted subframe of a predetermined cycle, the number of OFDM symbols which the end subframe information shows is equal to or greater than 7 and less than 11, the user terminal can assume that CSI-RSs/IMs are included in this subframe if OFDM symbols #5 and #6 are locations where CSI-RSs/IMs are allocated (when, in FIG. 17A, one of CSI-RS configurations #0, #5, #10 and #11 is configured, and/or when, in FIG. 17B, CSI-RS configuration #0 or #5 is configured).

Furthermore, when, in the above-noted subframe of a predetermined cycle, the number of OFDM symbols which the end subframe information shows is less than a predetermined value (which is, for example, 14, if normal CPs are used), the user terminal may presume an allocation pattern that is different from the normal CSI-RS/IM allocation patterns (see FIG. 17). This different allocation pattern may be, for example, formed with OFDM symbol #0 to #6 shown in FIG. 17.

(6) Others

According to the present embodiment, information about subframes in which downlink control information is not monitored and/or CSI measurements are not made (for example, the number of subframes, after the last subframe of a burst, in which monitoring and/or CSI measurements are not made) may be signaled in order to reduce the power consumption of user terminals. This subframe-related information may be signaled to user terminals in a cell in common, or may be reported to individual user terminals in the above cell separately.

Also, as described above, the transmission power of CRSs and/or CSI-RSs varies between bursts, and therefore information about CRS and/or CSI-RS transmission power may be signaled. This transmission power-related information may be signaled to user terminals in a cell in common, or may be reported to individual user terminals in the above cell separately.

(Common Signaling)

Next, common control information signaling methods (common signaling) according to the present embodiment will be described. According to the present embodiment, an example of signaling common control information by expanding a physical control channel, which is different from a downlink control channel (PDCCH or EPDCCH) (first example), an example of signaling common control information in a common search space provided in a downlink control channel of an unlicensed band cell (SCell) (second example), and an example of signaling common control information in a common search space provided in a downlink control channel of a PCell (third example) will be described.

Here, the common control information may include at least one of CRS information, CSI-RS/IM information, DRS information and burst information, but it is equally possible to include other pieces of information (for example, information about subframes in which monitoring of downlink control information and/or CSI measurements are not made, information about the transmission power of CRSs and/or CSI-RSs, and so on).

Also, the common control information may include end subframe information.

Furthermore, although cases will be described below in which the common control information includes CRS information, CSI-RS/IM information and burst information, the combination of information is not limited to this. For example, the common control information may include DRS information instead of CSI-RS/IM information, or may not include both CSI-RS/IM information and DRS information.

First Example

According to the first example, in an unlicensed band cell, common control information is signaled by expanding a physical control channel, which is not a downlink control channel (PDCCH or EPDCCH). An example to expand a control format indicator channel (PCFICH: Physical Control Format Indicator CHannel) will be described below.

Here, the PCFICH is a physical control channel for transmitting a control format indicator (CFI: Control Format Indicator) that indicates the number of OFDM symbols allocated to the PDCCH in a subframe. The PCFICH is placed in the top OFDM symbol in a subframe, and referenced by all the user terminals in a cell. Consequently, the PCFICH is expanded, it is possible to send common signaling without providing a common search space in a downlink control channel.

Although hereinafter a PCFICH that communicates other common control information in addition to CFIs will be referred to as an "enhanced PCFICH" to draw distinction from an existing PCFICH that communicates CFIs alone, this name is by no means limiting. An enhanced PCFICH may be referred to as an "ePCFICH," a "common control channel," and so on.

Figure 6A:
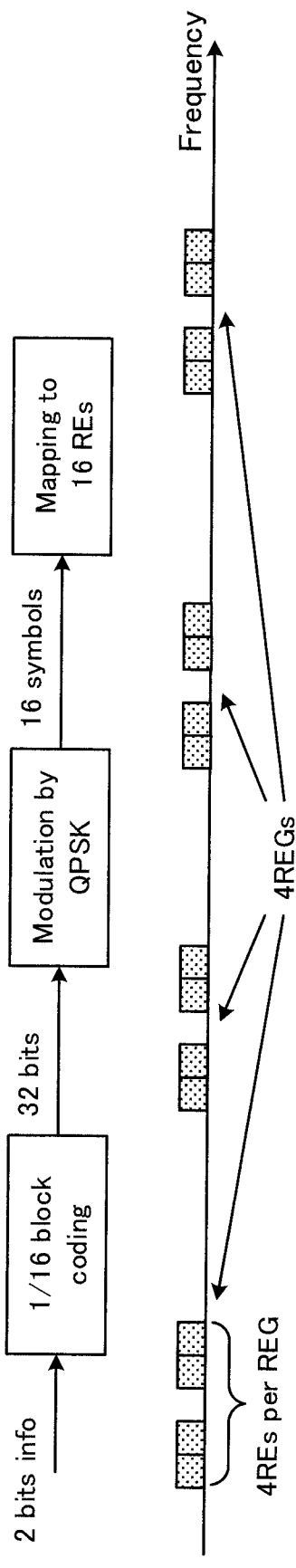
FIGS. 6A and 6B provide diagrams to show examples of an enhanced PCFICH according to the present embodiment.

Now, enhanced PCFICH configurations will be described with reference to FIGS. 6 to 8. FIG. 6A shows an existing PCFICH configuration. As shown in FIG. 6A, in an existing PCFICH, a two-bit CFI is encoded at a coding rate of 1/16, and a 32-bit encoded bit sequence is modulated in QPSK (Quadrature Phase Shift Keying). 16 symbols are mapped, per four symbols, to resource element groups (REGs) that are distributed in the frequency direction, based on physical cell IDs (PCIs: Physical Cell Identities). Note that one REG is formed with four resource elements (REs). Furthermore, the four REGs are mapped to the top OFDM symbol in a subframe.

By contrast with this, in an enhanced PCFICH, a predetermined number of bits of common control information is communicated, in addition to a two-bit CFI. For example, when CRS information (one bit), CSI-RS/IM information (one bit), burst information (two or four bits) are communicated in addition to a CFI (two bits), six or eight bits of common control information is communicated in total. Consequently, in an enhanced PCFICH, at least one of the encoding, the padding, the modulation and the mapping to REs in an existing PCFICH is changed, so that more bit information can be communicated.

Figure 6B:
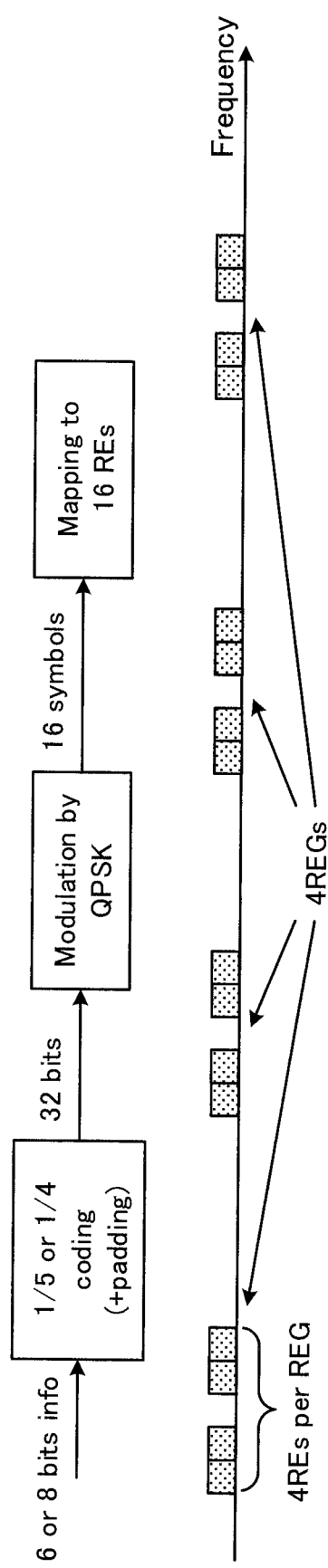

For example, FIG. 6B shows an example configuration in which, in comparison with an PCFICH, the coding rate is lowered, but in which the number of REs to map and the modulation scheme are maintained. In FIG. 6B, total six bits of common control information (CFI (two bits)+CRS information (one bit)+CSI-RS/IM information (one bit)+burst information (two bits)) is encoded at a coding rate of 1/5, and two bits are padded. Also, total eight bits of common control information (CFI (two bits)+CRS information (one bit)+CSI-RS/IM information (one bit)+burst information (four bits)) is encoded at a coding rate of 1/4. A 32-bit encoded bit sequence is QPSK-modulated and mapped to sixteen REs of four REG, like an existing PCFICH.

Figure 7A:
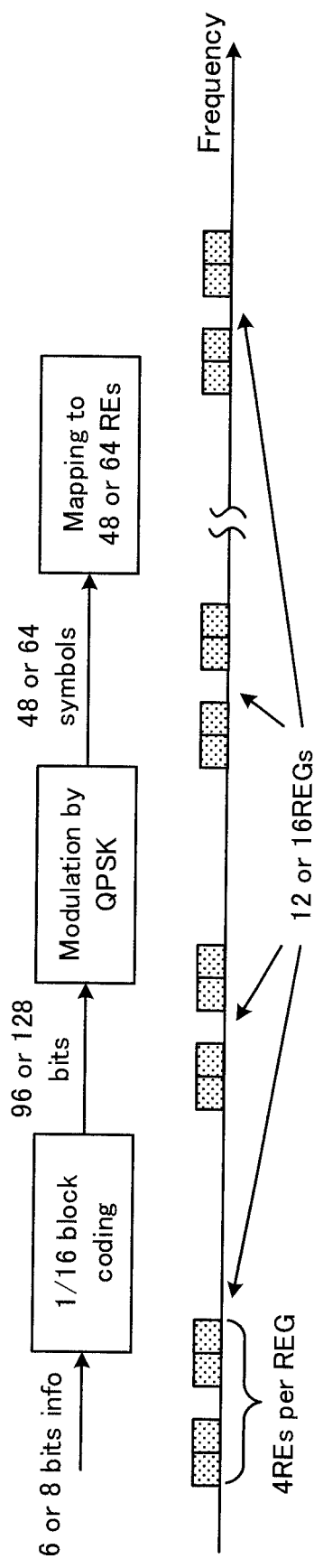
FIGS. 7A and 7B provide diagrams to show other examples of an enhanced PCFICH according to the present embodiment.
Figure 7B:
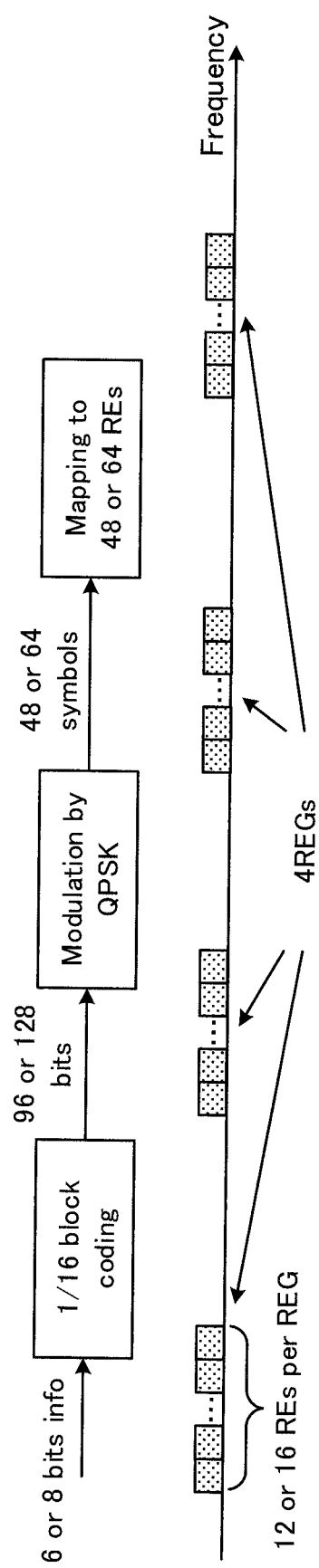

Also, FIGS. 7A and 7B show examples, in which, in comparison with an PCFICH, the number of REs to map is increased, and in which the coding rate and the modulation scheme are maintained. In FIGS. 7A and 7B, six or eight bits of common control information is encoded at a coding rate of 1/16, and a 96 or a 128-bit encoded bit sequence is QPSK-modulated.

As shown in FIG. 7A, the 48 or 64 modulated symbols may be mapped to 12 or 16 REGs. In this case, one REG is formed with four REs, like an existing PCFICH. Alternatively, as shown in FIG. 7B, the 48 or 64 modulated symbols may be mapped to four REGs. In this case, unlike an existing PCFICH, one REG is formed with 12 or 16 REs. In this way, when making the number of REs in an enhanced PCFICH greater than in an existing PCFICH, it is possible to maintain the number of REs in an REG and increase the number of REGs, or it is equally possible to maintain the number of REGs and increase the number of REs in an REG.

Figure 8A:
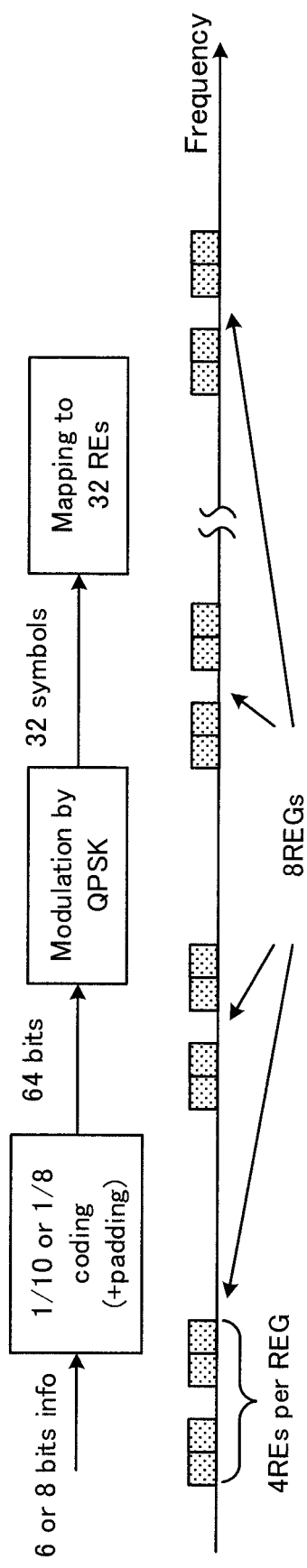
FIGS. 8A and 8B provide diagrams to show yet other examples of an enhanced PCFICH according to the present embodiment.

Furthermore, FIG. 8A shows an example configuration, in which, in comparison with an existing PCFICH, the coding rate is lowered and the number of REs to map is increased, and in which the modulation scheme is maintained. In FIG. 8A, six bits of common control information is encoded at a coding rate of 1/10, and four bits are padded. Also, eight bits of common control information is encoded at a coding rate of 1/8. A 64-bit encoded bit sequence is QPSK-modulated and mapped to 32 REs. Note that, although FIG. 8A shows a case where one REG is formed with four REs and shows mapping to eight REGs, this is by no means limiting. It is equally possible to increase the number of REs to constitute one REG to eight REs, and apply mapping to four REGs, as in an existing PCFICH.

Figure 8B:
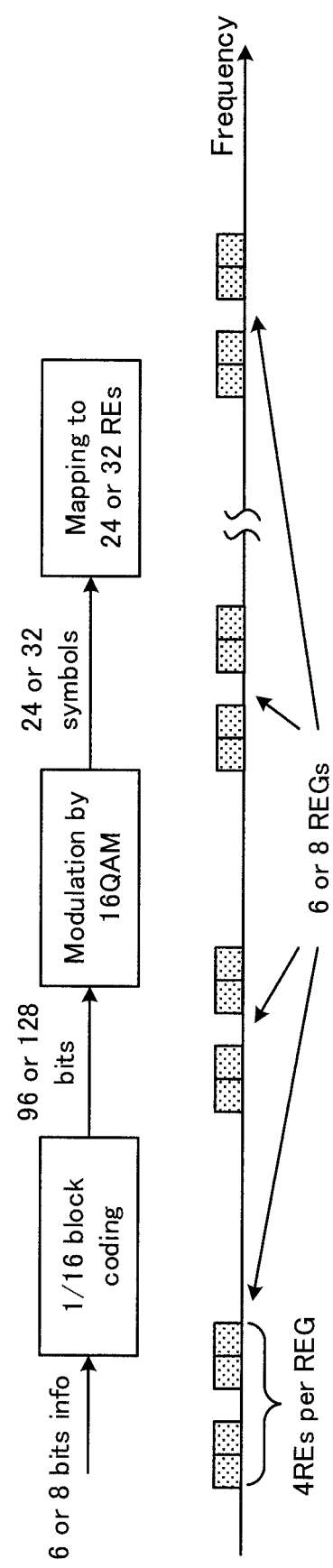

Also, FIG. 8B shows an example configuration in which the order of the modulation scheme is increased and the number of REs to map is increased, and in which the coding rate is maintained. In FIG. 8B, six or eight bits of common control information is encoded at a coding rate of 1/16. A 96 or a 128-bit encoded bit sequence is modulated in 16 QAM (Quadrature Amplitude Modulation), and mapped to 24 or 32 REs. Note that, although FIG. 8B shows a case where one REG is formed with four REs and shows mapping to six or eight REGs, this is by no means limiting. It is equally possible to increase the number of REs to constitute one REG to six or eight REs, and apply mapping to four REGs, as in an existing PCFICH.

According to the first example described above, it is not necessary to provide a common search space in a downlink control channel in an unlicensed band cell, and yet it is still possible to communicate common control information to user terminals in this cell. Furthermore, the number of REs to which an enhanced PCFICH is mapped does not change significantly in comparison with an existing PCFICH (for example, in FIG. 6B, the number is sixteen REs, which is the same as with an existing PCFICH). Consequently, the overhead by signaling additional common control information is not produced or can be minimized.

Note that, in FIGS. 6 to 8, the REs where an enhanced PCFICH may be the top OFDM symbol in a subframe, or may be OFDM symbols other than the top OFDM symbol. Also, whether a user terminal references an existing PCFICH or references an enhanced PCFICH may be commanded by higher layer signaling, or may be configured in the user terminal in advance.

Also, in an unlicensed band cell, the PDCCH is allocated to the top one or the second OFDM symbol, and is not allocated to the third OFDM symbol. In this case, the number of CFI bits can be reduced from two bits to one bit.

Also, in a TTI (partial starting TTI) (hereinafter referred to as a "partial TTI") that starts from the middle of a subframe, common control information in an unlicensed band cell needs not be transmitted. In a partial TTI, an existing PCFICH and PDCCH may be allocated in the top OFDM symbol in the second slot of a subframe. In this case, in the partial TTI, the user terminal does not allocate CRSs to four or six OFDM symbols and does not allocate CSI-RSs/IMs because a new burst can be presumed to start.

Figure 9A:
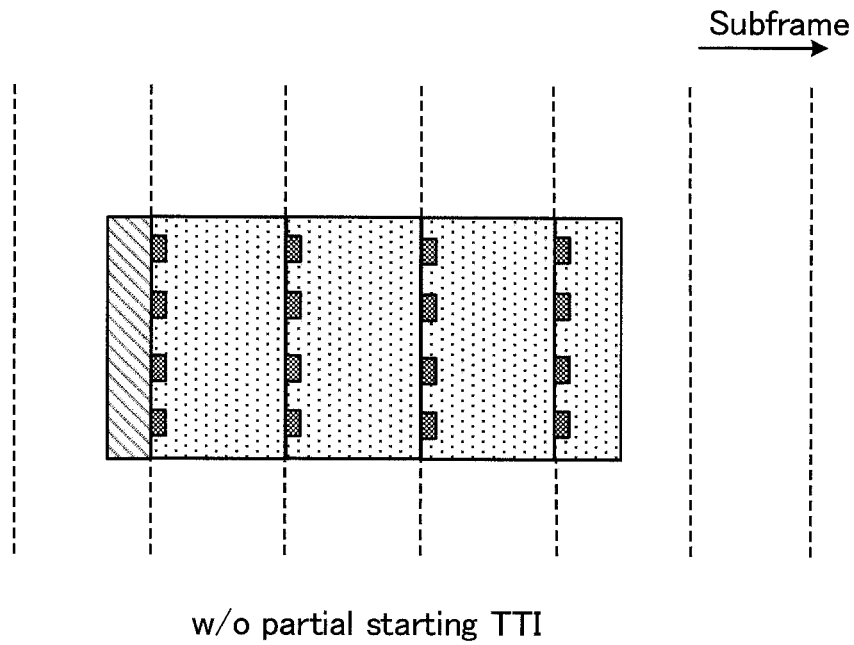
FIGS. 9A and 9B provide diagrams to show examples of partial TTIs according to the present embodiment.
Figure 9B:
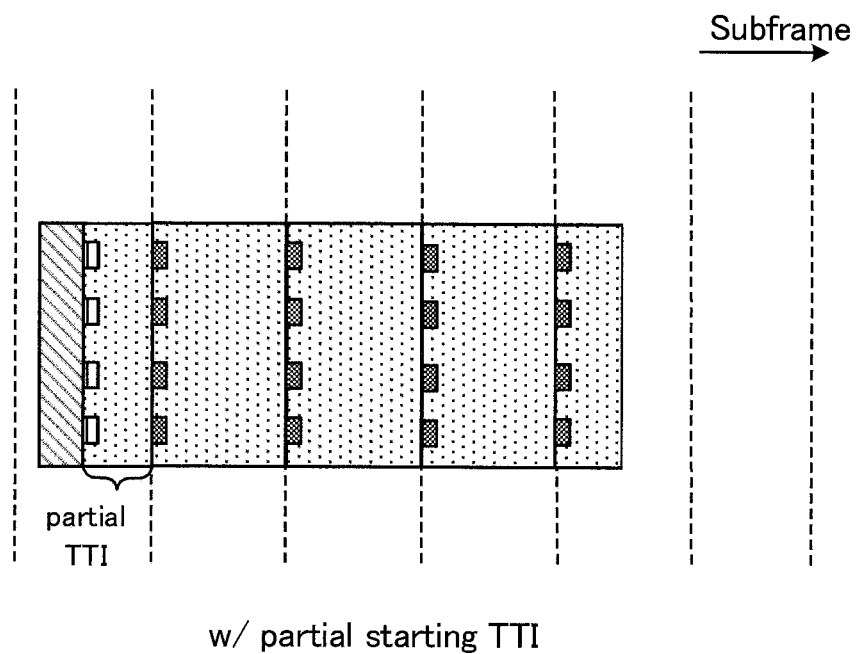

For example, as shown in FIGS. 9A and 9B, in subframes where there are no partial TTIs, an enhanced PCFICH may be allocated to the top OFDM symbol of a subframes. Meanwhile, in a partial TTI, as shown in FIG. 9B, common control information for an unlicensed band cell needs not be transmitted, so that it is possible to allocate an existing PCFICH to the OFDM symbol in which the partial TTI begins.

Second Example

According to a second example, common control information is signaled in a common search space that is provided in a downlink control channel (PDCCH or EPDCCH) of an unlicensed band cell (SCell).

To be more specific, with the second example, either a new radio network temporary identifier (RNTI) is introduced for an unlicensed band cell, or an SI (System Information)—RNTI, which is not used in SCells, is used.

Figure 10A:
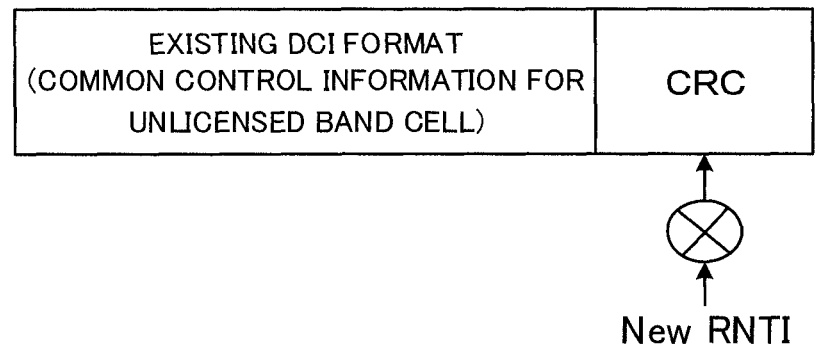
FIGS. 10A and 10B provide diagrams to show examples of generation of common control information according to the present embodiment.
Figure 10B:
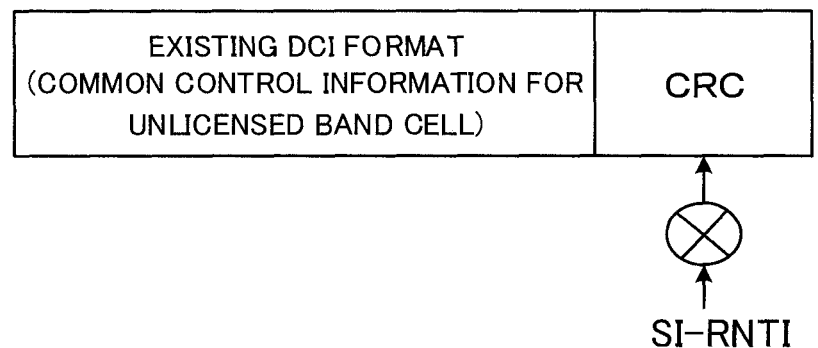

FIG. 10 provide diagrams to show examples of generation of common control information according to the second example. A radio base station includes common control information in an existing DCI format, and attaches cyclic redundancy check (CRC) bits, which is scrambled (masked) by an RNTI for an unlicensed band cell (see FIG. 10A) or by an SI-RNTI (see FIG. 10B). The radio base station allocates the common control information with an attachment of the above CRC bits, in the common search space in the unlicensed band cell's downlink control channel, and transmits this.

A user terminal applies blind decoding to the common search space in the primary cell's downlink control channel, and, if the DCI can be decoded properly by using the CRC bits that is descrambled by the unlicensed band cell's RNTI or SI-RNTI, interprets the DCI in the existing format, to which this CRC bits is attached, as the above-noted common control information. Note that the unlicensed band cell RNTI and SI-RNTI may be reported to the user terminal in advance by higher layer signaling (for example, RRC signaling, system information, etc.).

Also, for example, DCI format 1C may be used as the existing DCI format shown in FIG. 10A and FIG. 10B. DCI format 1C has a bandwidth of 20 MHz and is 15 bits long, so that the above-described CRS information (one bit), the CSI-RS/IM information (one bit) and the burst information (two or four bits) can be included.

According to the second example described above, CRC bits are added to common control information, so that it is possible to prevent common control information detection errors in user terminals. Also, for example, the total number of bits combining the CRS information (one bit), the CSI-RS/IM information (one bit) and the burst information (two or four bits) is four or six bits, so that the 15 bits of existing DCI format 1C still has some extra room. Consequently, in comparison with the first example, it is possible to improve the extensibility of common control information.

Note that, when common control information is allocated to the common search space in an unlicensed band EPDCCH, information regarding the presence/absence of a common search space in the EPDCCH may be reported to the user terminal via higher layer signaling. In this case, the user terminal may specify the resource where the common search space is allocated based on the PCI, the subframe index and so on.

Alternatively, if the common control information is allocated to the common search space of an unlicensed band EPDCCH, resource information to indicate the resource where the common search space is allocated in the EPDCCH may be reported to the user terminal via higher layer signaling.

Third Example

According to a third example, common control information is signaled in a common search space that is provided in a downlink control channel (PDCCH or EPDCCH) of a primary cell (PCell) that is placed in carrier aggregation or dual connectivity with an unlicensed band cell (SCell). To be more specific, according to the third example, a new radio network temporary identifier (RNTI) for an unlicensed band cell is introduced. Note that, since PCells use SI-RNTIs in existing systems, with third example, it is not preferable to use an SI-RNTI.

As has been described earlier with reference to FIG. 10A, a radio base station includes common control information in an existing DCI format and attaches CRC bits that are scrambled (masked) by an unlicensed band cell RNTI. The radio base station allocates the common control information, with an attachment of the above CRC bits, in the common search space of the primary cell's downlink control channel (cross carrier scheduling), and transmits this.

A user terminal applies blind decoding to the common search space in the primary cell's downlink control channel, and, if the DCI can be decoded properly by using the CRC bits that is descrambled by the unlicensed band cell RNTI, interprets the DCI in the existing format, to which this CRC bits is attached, as the above-noted common control information. Note that the unlicensed band cell RNTI may be reported to the user terminal in advance by higher layer signaling (for example, RRC signaling, system information, etc.).

According to the third example described above, it is not necessary to provide a common search space in a downlink control channel in an unlicensed band cell as in the second example, and yet it is still possible to communicate common control information to user terminals in this cell. Furthermore, since CRC bits are added to the common control information, it is possible to prevent common control information detection errors in user terminals.

Note that, although, when cross carrier scheduling is employed as in the third example, SCell-identifying indices (for example, five bits when there are 32 CCs) may be included in an existing DC format, even if the SCell indices (five bits) are added on top of the above-mentioned total number of bits, which is four bits or six bits, the 15 bits of existing DC format 1C still has some extra room. Consequently, in comparison to the first example, it is possible to improve the extensibility of common control information.

Also, when common control information is allocated to the common search space of the primary cell's EPDCCH, information regarding the presence/absence of a common search space in the EPDCCH or information about the resource where this common search space is allocated may be reported to the user terminal via higher layer signaling.

(UE-Specific Signaling)

Next, a method of signaling unique control information (UE-specific signaling) according to the present embodiment will be described. According to the present embodiment, unique control information is either signaled in user-specific search spaces provided in a downlink control channel of an unlicensed band cell (SCell), or signaled in user-specific search spaces provided in a downlink control channel of the PCell that executes CA or DC with the above cell.

Here, the unique control information may be presumed to include at least one of end subframe information and DRS information, the unique control information may include other pieces of information as well (for example, information about subframes in which downlink control information monitoring and/or CSI measurements are not made, information about the transmission power of CRSs and/or CSI-RSs, etc.).

For example, unique control information to include the above-described end subframe information (three bits) and DRS information (one bit) is to be signaled, additional four bits are required. Consequently, a new DCI format with an increased number of bits may be introduced.

(Radio Communication System)

Now, the structure of the radio communication system according to the present embodiment will be described below. In this radio communication system, the above-described common signaling and/or UE-specific signaling are employed.

Figure 11:
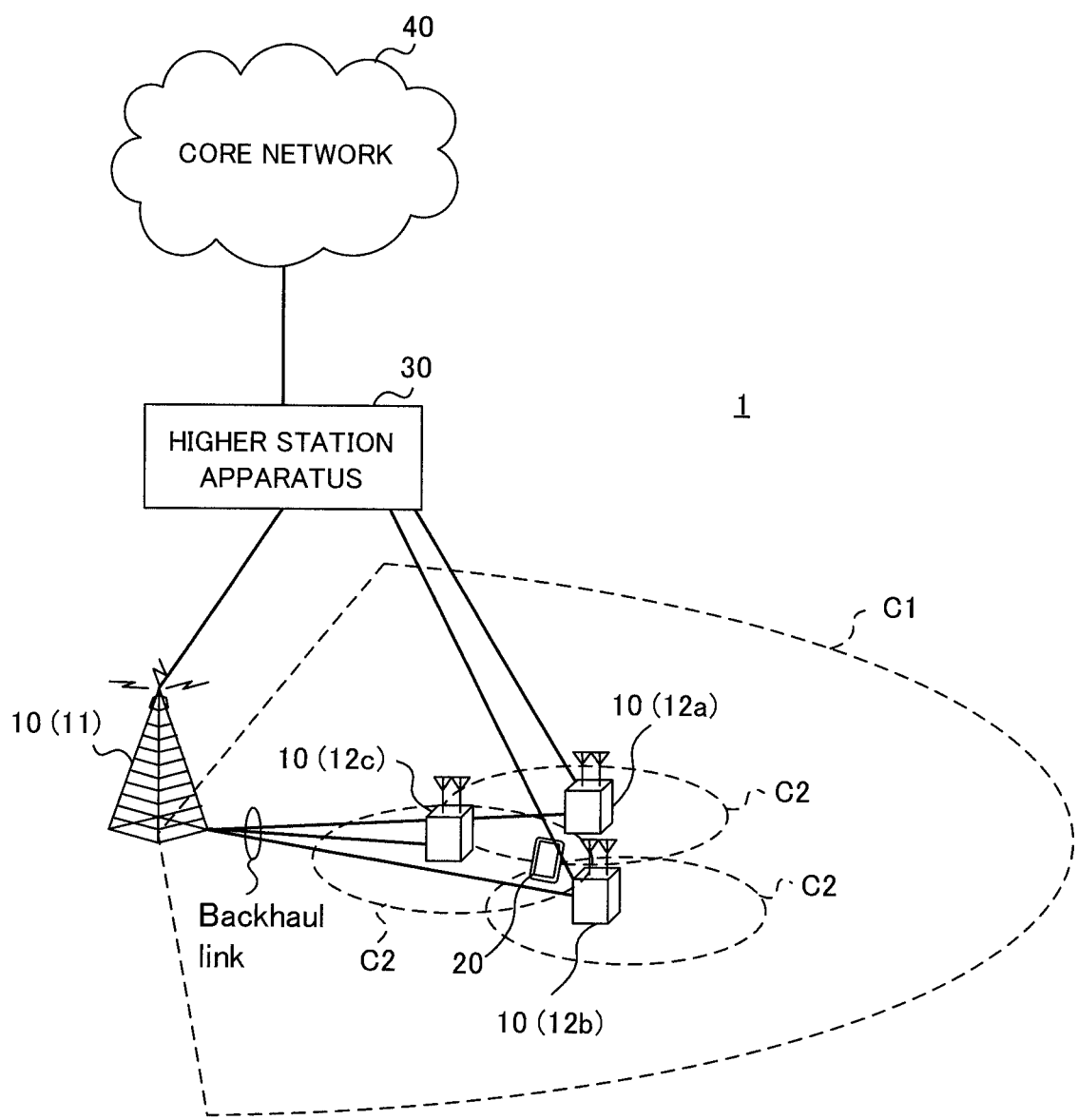
FIG. 11 is a diagram to show an example of a schematic structure of a radio communication system according to the present embodiment.

FIG. 11 is a diagram to show an example of a schematic structure of a radio communication system according to the present embodiment. The radio communication system 1 can adopt carrier aggregation (CA) and/or adopt dual connectivity (DC) to group a plurality of fundamental frequency blocks (component carriers) into one, where the LTE system bandwidth constitutes one unit. Also, the radio communication system 1 has a radio base station (for example, an LTE-U base station) that is capable of using unlicensed bands.

Note that the radio communication system 1 may be referred to as "SUPER 3G," "LTE-A," (LTE-Advanced), "IMT-Advanced," "4G" (4th generation mobile communication system), "5G" (5th generation mobile communication system), "FRA" (Future Radio Access) and so on.

The radio communication system 1 shown in FIG. 11 includes a radio base station 11 that forms a macro cell C1, and radio base stations 12 (12a to 12c) that form small cells C2, which are placed within the macro cell C1 and which are narrower than the macro cell C1. Also, user terminals 20 are placed in the macro cell C1 and in each small cell C2. For example, a mode may be possible in which the macro cell C1 is used in a licensed band and the small cells C2 are used in unlicensed bands (LTE-U). Also, a mode may be also possible in which part of the small cells is used in a licensed band and the rest of the small cells are used in unlicensed bands.

The user terminals 20 can connect with both the radio base station 11 and the radio base stations 12. The user terminals 20 may use the macro cell C1 and the small cells C2, which use different frequencies, at the same time, by means of CA or DC. For example, it is possible to transmit assist information (for example, the DL signal configuration) related to a radio base station 12 (which is, for example, an LTE-U base station) that uses an unlicensed band, from the radio base station 11 that uses a licensed band to the user terminals 20. Here, a structure may be employed in which, when CA is used between the licensed band and the unlicensed band, one of the radio base stations (for example, the radio base station 11) controls the scheduling of the licensed band cells and the unlicensed band cells.

Note that the user terminals 20 may be configured to connect with the radio base stations 12 without connecting with the radio base stations 11. For example, it is possible to use a structure in which a radio base station 12 that uses an unlicensed band connects with the user terminals 20 in stand-alone. In this case, the radio base station 12 controls the scheduling of unlicensed band cells.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the configuration of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pico base stations," "femto base stations," "HeNBs" (Home eNodeBs), "RRHs" (Remote Radio Heads), "transmitting/receiving points" and so on. Hereinafter the radio base stations 11 and 12 will be collectively referred to as "radio base stations 10," unless specified otherwise. Also, it is preferable to configure radio base stations 10 that use the same unlicensed band on a shared basis to be synchronized in time.

The user terminals 20 are terminals to support various communication schemes such as LTE, LTE-A and so on, and may be either mobile communication terminals or stationary communication terminals.

In the radio communication system 1, as radio access schemes, orthogonal frequency division multiple access (OFDMA) is applied to the downlink, and single-carrier frequency division multiple access (SC-FDMA) is applied to the uplink. OFDMA is a multi-carrier communication scheme to perform communication by dividing a frequency band into a plurality of narrow frequency bands (subcarriers) and mapping data to each subcarrier. SC-FDMA is a single-carrier communication scheme to mitigate interference between terminals by dividing the system band into bands formed with one or continuous resource blocks per terminal, and allowing a plurality of terminals to use mutually different bands. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. The PDSCH may be referred to as a "down link data channel." User data, higher layer control information and SIBs (System Information Blocks) are communicated in the PDSCH. Also, MIBs (Master Information Blocks) are communicated in the PBCH.

The downlink L1/L2 control channels include a PDCCH (Physical Downlink Control Channel), an EPDCCH (Enhanced Physical Downlink Control Channel), a PCFICH (Physical Control Format Indicator Channel), an enhanced PCFICH (Enhanced Physical Control Format Indicator Channel), a PHICH (Physical Hybrid-ARQ Indicator Channel) and so on. Downlink control information (DCI) including PDSCH and PUSCH scheduling information is communicated by the PDCCH. A CFI (Control Format Indicator), which indicates the number of OFDM symbols to use for the PDCCH, is communicated by the PCFICH. HARQ delivery acknowledgement signals (ACKs/NACKs) in response to the PUSCH are communicated by the PHICH. The EPDCCH is frequency-division-multiplexed with the PDSCH and used to communicate DCI and so on, like the PDCCH. An enhanced PCFICH is used to communicate common control information for unlicensed band cells, in addition to the CFI.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. The PUSCH may be referred to as an uplink data channel. User data and higher layer control information are communicated by the PUSCH. Also, downlink radio quality information (CQI: Channel Quality Indicator), delivery acknowledgment information (ACKs/NACKs) and so on are communicated by the PUCCH. By means of the PRACH, random access preambles for establishing connections with cells are communicated.

In the radio communication systems 1, cell-specific reference signals (CRSs), channel state information reference signals (CSI-RSs), demodulation reference signal (DMRSs), detection/measurement reference signals (DRSs (Discovery Reference Signals) and so on are communicated as downlink reference signals. Also, in the radio communication system 1, measurement reference signals (SRSs: Sounding Reference Signals), demodulation reference signals (DMRSs) and so on are communicated as uplink reference signals. Note that, the DMRSs may be referred to as user terminal-specific reference signals (UE-specific reference signals). Also, the reference signals to be communicated are by no means limited to these.

<Radio Base Station>

Figure 12:
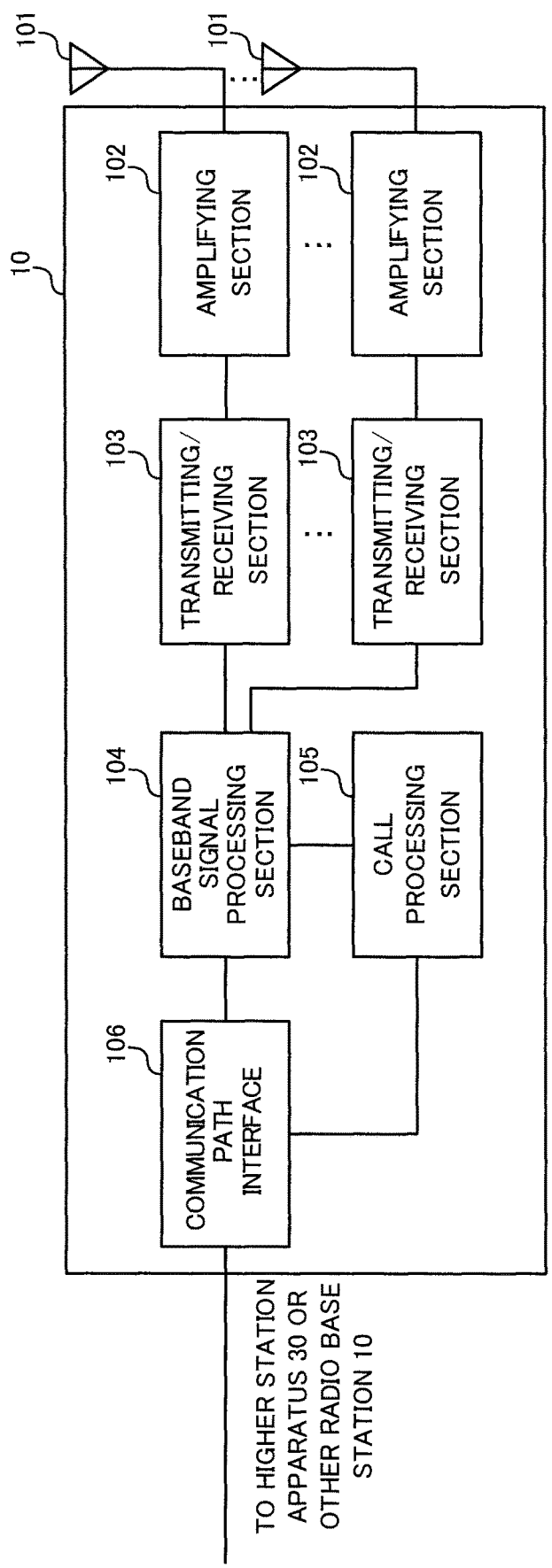
FIG. 12 is a diagram to show an example of an overall structure of a radio base station according to the present embodiment.

FIG. 12 is a diagram to show an example of an overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are pre-coded and output from the baseband signal processing section 104 on a per antenna basis are converted into a radio frequency band in the transmitting/receiving sections 103, and then transmitted. The radio frequency signals subjected to frequency conversion in the transmitting/receiving sections 103 are amplified in the amplifying sections 102, and transmitted from the transmitting/receiving antennas 101.

The transmitting/receiving sections 103 are capable of transmitting/receiving uplink (UL)/downlink (DL) signals in unlicensed bands. Note that the transmitting/receiving sections 103 may be capable of transmitting/receiving UL/DL signals in licensed bands as well. The transmitting/receiving sections 103 can be constituted by transmitters/receivers, transmitting/receiving circuits or transmitting/receiving devices that can be described based on common understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (for example, an interface in compliance with the CPRI (Common Public Radio Interface)m such as optical fiber, the X2 interface).

Note that the transmitting/receiving sections 103 transmit downlink signals to the user terminal 20 by using at least an unlicensed band. For example, the transmitting/receiving sections 103 transmit a DRS, which includes CSI-RSs that are frequency-multiplexed with the PSS/SSS, to the user terminals 20, in an unlicensed band, in a DMTC duration that is configured in the user terminals 20.

Also, the transmitting/receiving sections 103 receive uplink signals from the user terminal 20 by using at least an unlicensed band. For example, the transmitting/receiving sections 103 may transmit RRM measurement and/or CSI measurement results (for example, CSI feedback) in a licensed band and/or an unlicensed band.

Furthermore, the transmitting/receiving sections 103 transmit common control information and/or unique control information. Here, the common control information includes at least one of CRS information, CSI-RS/IM information, DRS information and burst information. The unique control information includes at least one of end subframe information and DRS information. Furthermore, the transmitting/receiving sections 103 transmit higher layer control information.

Also, the common control information that is transmitted in the transmitting/receiving sections 103 may include end subframe information.

Figure 13:
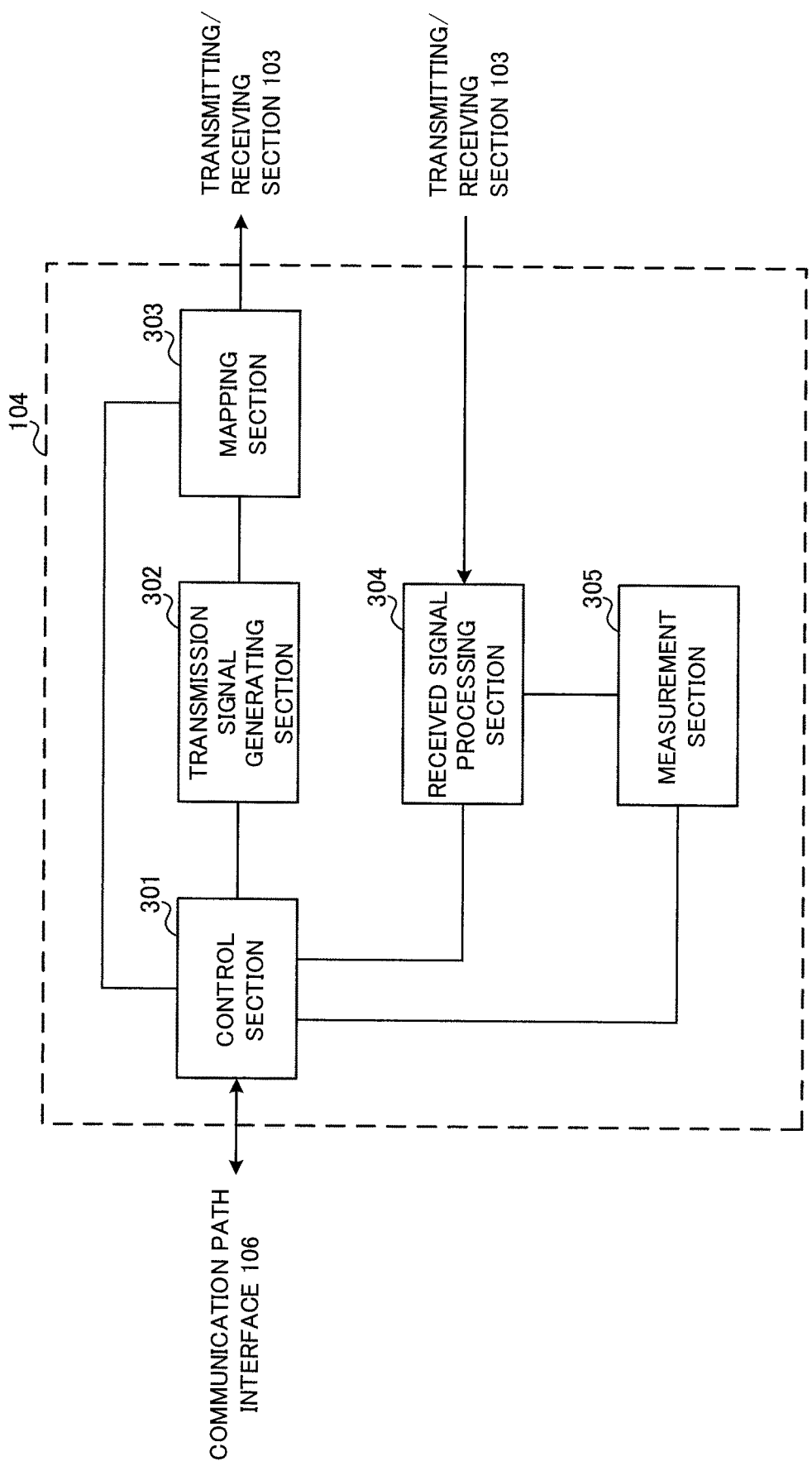
FIG. 13 is a diagram to show an example of a functional structure of a radio base station according to the present embodiment.

FIG. 13 is a diagram to show an example of a functional structure of a radio base station according to one embodiment of the present invention. Note that, although FIG. 13 primarily shows functional blocks that pertain to characteristic parts of the present embodiment, the radio base station 10 has other functional blocks that are necessary for radio communication as well. As shown in FIG. 13, the baseband signal processing section 104 has a control section (scheduler) 301, a transmission signal generating section (generating section) 302, a mapping section 303, a received signal processing section 304 and a measurement section 305.

The control section (scheduler) 301 controls the whole of the radio base station 10. Note that, when a licensed band and an unlicensed band are scheduled with one control section (scheduler) 301, the control section 301 controls communication in the licensed band cells and the unlicensed band cells. For the control section 301, a controller, a control circuit or a control device that can be described based on common understanding of the technical field to which the present invention pertains can be used.

The control section 301, for example, controls the generation of signals in the transmission signal generating section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals that are transmitted in the PDSCH, downlink control signals (common control information and unique control information) that are communicated in the PDCCH and/or the EPDCCH, and common control information that is transmitted in the enhanced PCFICH. Also, the control section 301 controls the scheduling of synchronization signals (PSS (Primary Synchronization Signal)/SSS (Secondary Synchronization Signal)) and downlink reference signals such as CRSs, CSI-RSs and DMRSs.

Also, the control section 301 controls the scheduling of uplink data signals transmitted in the PUSCH, uplink control signals transmitted in the PUCCH and/or the PUSCH (for example, delivery acknowledgement signals (HARQ-ACKs)), random access preambles transmitted in the PRACH, uplink reference signals and so on.

The control section 301 controls the transmission of downlink signals in the transmission signal generating section 302 and the mapping section 303 in accordance with the results of LBT acquired in the measurement section 305. To be more specific, the control section 301 controls the generation, mapping and transmission of each signal that is included in the DRS (LAA DRS) so that the DRS is transmitted in an unlicensed band.

Here, the control section 301 may control the generation and mapping of the above-note common control information and/or unique control information. To be more specific, the control section 301 controls the generation of common control information that is communicated via an enhanced PCFICH, which is an extended version of a PCFICH, coding of CFI and common control information (for example, joint coding), modulation, mapping and so on (see the first example, FIGS. 6 to 8). Note that at least one of the coding rate of the enhanced PCFICH, the number of resource elements to be mapped and the modulation scheme is different from that of the PCFICH.

Alternatively, the control section 301 controls CRC bits, which is scrambled by using an RNTI or an SI-RNTI for an unlicensed band cell, to be attached to the common control information (see the second and the third example). Also, the control section 301 controls the above common control information, with an attachment of the CRC bits, to be allocated to a common search space in a downlink control channel (PDCCH or EPDCCH) of an unlicensed band cell or primary cell that executes CA or DC with this cell.

Also, when a common search space is provided in an EPDCCH, the control section 301 controls information about the presence/absence of a common search space in this EPDCCH or information about the resource where this common search space is allocated to be transmitted via higher layer signaling (second and third example).

The transmission signal generating section 302 generates downlink signals (downlink control signals, downlink data signals, downlink reference signals and so on) based on commands from the control section 301, and outputs these signals to the mapping section 303. The transmission signal generating section 302 can be constituted by a signal generator, a signal generating circuit or a signal generating device that can be described based on common understanding of the technical field to which the present invention pertains.

For example, the transmission signal generating section 302 generates DL assignments, which report downlink signal allocation information, and UL grants, which report uplink signal allocation information, based on commands from the control section 301. Also, the downlink data signals are subjected to a coding process and a modulation process by using coding rates, modulation schemes and so on, determined based on the results of CSI measurements in each user terminal 20 and so on. Also, the transmission signal generating section 302 generates a DRS that includes a PSS, an SSS, CRSs, CSI-RSs and so on.

Also, the transmission signal generating section 302 generates common control information and unique control information based on commands from the control section 301 (including the coding process, the modulation process, and so on). To be more specific, the transmission signal generating section 302 may generate common control information to communicate in an enhanced CFI indicator channel, by making at least one of the coding rate, the number of resource elements and the modulation scheme different from that of an existing PCFICH (first example). Alternatively, the transmission signal generating section 302 may attach CRC bits, scrambled by using an RNTI or an SI-RNTI for an unlicensed band cell, to the common control information (the second and the third example).

The mapping section 303 maps the downlink signals generated in the transmission signal generating section 302 to predetermined radio resources based on commands from the control section 301, and outputs these to the transmitting/receiving sections 103. The mapping section 303 can be constituted by a mapper, a mapping circuit or a mapping device that can be described based on common understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals and so on). The received signal processing section 304 can be constituted by a signal processor, a signal processing circuit or a signal processing device that can be described based on common understanding of the technical field to which the present invention pertains.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or a measurement device that can be described based on common understanding of the technical field to which the present invention pertains.

The measurement section 305 executes LBT in a carrier where LBT is configured (for example, an unlicensed band) based on commands from the control section 301, and outputs the results of LBT (for example, judgments as to whether the channel state is idle or busy) to the control section 301.

Also, the measurement section 305 may measure the received power (for example, the RSRP (Reference Signal Received Power)), the received quality (RSRQ (Reference Signal Received Quality)), the channel states and so on of the received signals. The measurement results may be output to the control section 301.

<User Terminal>

Figure 14:
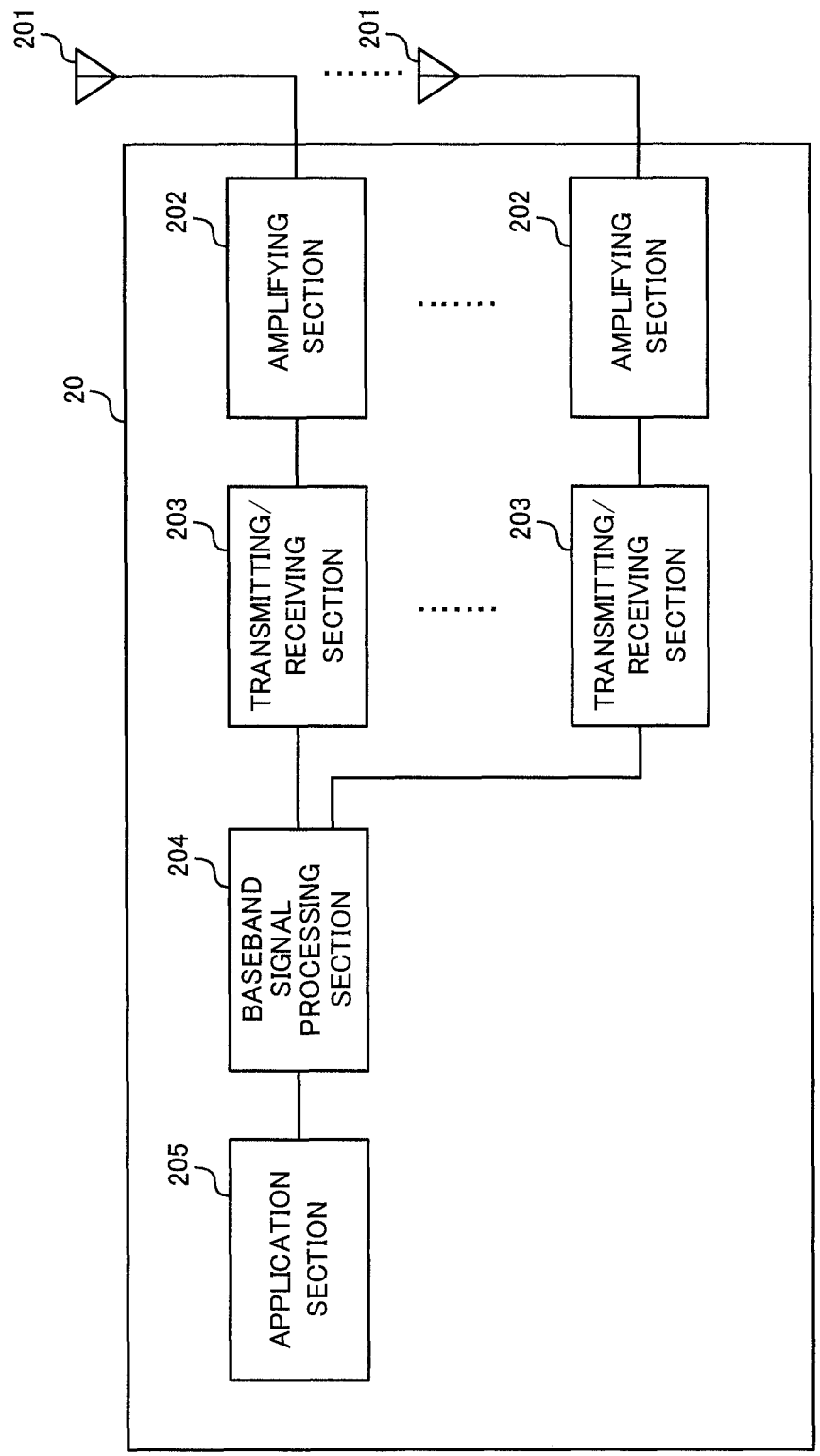
FIG. 14 is a diagram to show an example of an overall structure of a user terminal according to the present embodiment.

FIG. 14 is a diagram to show an example of an overall structure of a user terminal according to the present embodiment. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in a plurality of transmitting/receiving antennas 201 are each amplified in the amplifying sections 202. Each transmitting/receiving section 203 receives the downlink signals amplified in the amplifying sections 202. The received signals are subjected to frequency conversion and converted into the baseband signal in the transmitting/receiving sections 203, and output to the baseband signal processing section 204. The transmitting/receiving sections 203 are capable of transmitting/receiving UL/DL signals in unlicensed bands. Note that the transmitting/receiving sections 203 may be capable of transmitting/receiving UL/DL signals in licensed bands as well.

The transmitting/receiving sections 203 can be constituted by transmitters/receivers, transmitting/receiving circuits or transmitting/receiving devices that can be described based on common understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to the transmitting/receiving section 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 receive downlink signals transmitted from the radio base station 10, by using at least an unlicensed band. For example, the transmitting/receiving sections 203 receive a DRS, which includes CSI-RSs that are frequency-multiplexed with the PSS/SSS, in an unlicensed band, in a DMTC duration that is configured by the radio base station 10.

Also, the transmitting/receiving sections 203 transmit uplink signals to the radio base station 10 by using at least an unlicensed band. For example, the transmitting/receiving sections 203 may transmit DRS RRM measurement results and/or CSI measurement results (for example, CSI feedback) in a licensed band and/or an unlicensed band.

Also, the transmitting/receiving sections 203 receive common control information and/or unique control information. Furthermore, the transmitting/receiving sections 203 receive higher layer control information.

Figure 15:
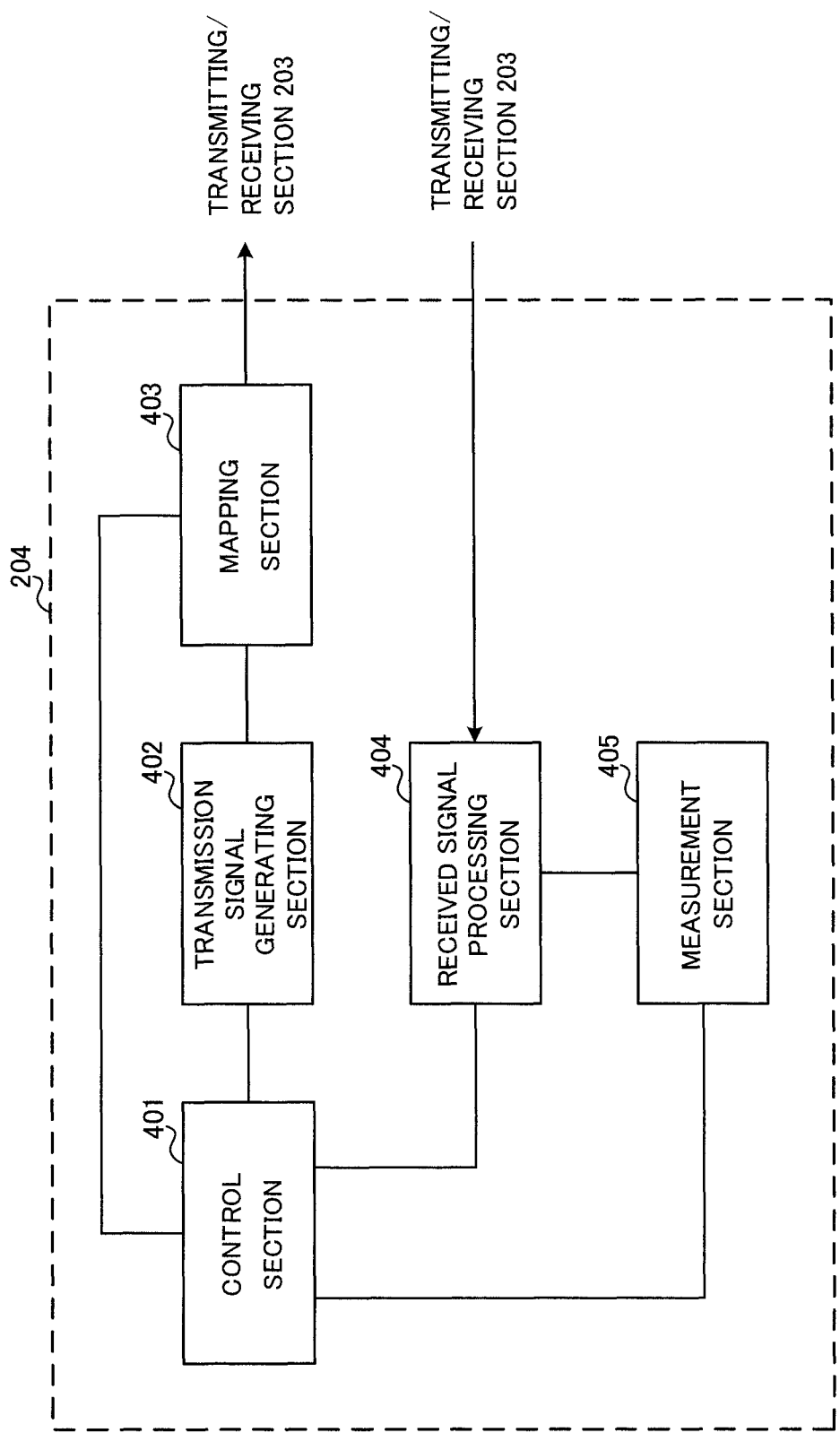
FIG. 15 is a diagram to show an example of a functional structure of a user terminal according to the present embodiment.

FIG. 15 is a diagram to show an example of a functional structure of a user terminal according to one embodiment of the present invention. Note that, although FIG. 15 primarily shows functional blocks that pertain to characteristic parts of the present embodiment, the user terminal 20 has other functional blocks that are necessary for radio communication as well. As shown in FIG. 15, the baseband signal processing section 204 provided in the user terminal 20 at least has a control section 401, a transmission signal generating section 402, a mapping section 403, a received signal processing section 404 and a measurement section 405.

The control section 401 controls the whole of the user terminal 20. The control section 401 can be constituted by a controller, a control circuit or a control device that can be described based on common understanding of the technical field to which the present invention pertains.

The control section 401, for example, controls the generation of signals in the transmission signal generating section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals (signals transmitted in the PDCCH/EPDCCH) and downlink data signals (signals transmitted in the PDSCH) transmitted from the radio base station 10, from the received signal processing section 404. The control section 401 controls the generation of uplink control signals (for example, delivery acknowledgement signals (HARQ-ACKs) and so on) and uplink data signals based on the downlink control signals, the results of deciding whether or not retransmission control is necessary for the downlink data signals, and so on.

The control section 401 controls the received signal processing section 404 and the measurement section 405 to carry out RRM measurements and/or CSI measurements, cell search and so on in an unlicensed band. Note that RRM measurements may be performed by using LAA DRSs. Also, CSI measurements may be carried out by using LAA DRSs, or by using CSI-RSs/IMs. Furthermore, the control section 401 may control the transmission signal generating section 402 and the mapping section 403 to transmit uplink signals based on LBT results acquired in the measurement section 405.

To be more specific, the control section 401 may control the receiving processes of the above-described common control information and/or unique control information. To be more specific, the control section 401 the receiving processes (for example, demodulation, decoding, etc.) of common control information via an enhanced PCFICH (see the first example, FIGS. 6 to 8).

Alternatively, the control section 401 may control the receiving processes (for example, blind decoding, demodulation, decoding, etc.) of common control information that is allocated in a common search space in an unlicensed band cell's downlink control channel (second example). If DCI can be decoded properly by using CRC bits that are descrambled by the unlicensed band cell's RNTI or SI-RNTI, the control section 401 interprets the DCI in the existing format, to which this CRC bits are attached, as the above-noted common control information.

Alternatively, the control section 401 may control the receiving processes (for example, blind decoding, demodulation, decoding, etc.) of common control information that is allocated in a common search space in a downlink control channel of a primary cell that executes CA or DC with an unlicensed band cell (third example). If DCI can be decoded properly by using CRC bits that are descrambled by the unlicensed band cell's RNTI, the control section 401 interprets the DCI in the existing format, to which these CRC bits are attached, as the above-noted common control information.

Also, when a common search space is provide in an EPDCCH, the control section 401 may detect information about the resource where the common search space is allocated, based on information that is provided via higher layer signaling (for example, information about the presence/absence of a common search space in the EPDCCH, resource information itself, etc.) (the second and the third example).

Also, the control section 401 may control the receiving processes of unique control information that is allocated in user-specific search spaces in a downlink control channel of an unlicensed band cell or a primary cell that executes DC with this cell (for example, blind decoding, demodulation, decoding, etc.).

Also, based on common control information and/or unique control information, the control section 401 may control at least one of the channel state information (CSI) measurement, the synchronization, the PDSCH demodulation and the rate matching in the subframe in which the common control information and/or the unique control information are received. For example, the control section 401 controls at least one of the synchronization, the CRS-based CSI measurement, the PDSCH demodulation and the rate matching based on the above-described CRS information.

Also, the control section 401 may control CSI measurements in DRS subframes based on the above-described CSI-RS/IM information. Alternatively, the control section 401 may control CSI measurements and/or rate matching in DRS subframes based on the above-described DRS information. Furthermore, the control section 401 may control a CSI measurement to be made in the first subframe that is detected to include a PSS, an SSS and CRSs in a DMTC. Also, the control section 401 may find the average of CSI measurement results within the same burst based on the above-described burst information. Also, the control section 401 may control the demodulation and/or the rate matching of the PDSCH that is mapped to the last subframe, based on the above-described end subframe information.

Also, the control section 401 may identify the signal configuration in the last subframe of a burst based on the above-described end subframe information, based on the result of this identification, control at least one of the RRM measurement, the CSI measurement and the PDSCH rate matching in the last subframe of the burst.

To be more specific, the control section 401 may judge whether or not a PSS/SSS are allocated in subframes #0 and #5, where a PSS/SSS are normally allocated, based on the number of OFDM symbols shown by the end subframe information. For example, when, in subframe #0 or #5, the number of OFDM symbols shown by the end subframe information is less than a predetermined number, the control section 401 may assume that subframe #0 or #5 does not include a PSS/SSS. Here, the predetermined number may be, for example, fourteen or seven, if normal CPs are used.

Also, the control section 401 can identify whether or not CSI-RSs/IMs are allocated in a subframe having a predetermined cycle (for example, a cycle of 5 ms or 10 ms) that is configured by higher layer signaling, based on the number of OFDM symbols shown by the end subframe information. For example, when, in the above-noted subframe of a predetermined cycle, the number of OFDM symbols shown by the end subframe information is less than a predetermined number, the control section 401 may assume that this subframe does not include CSI-RSs/IMs. Here, the predetermined number may be, for example, fourteen or eleven if normal CPs are used.

Furthermore, in the above-noted subframe of a predetermined cycle, the control section 401 may identify whether or not CSI-RSs/IMs are allocated in this subframe, based on the number of OFDM symbols shown by the end subframe information, and CSI-RS configurations reported by higher layer signaling (see FIG. 17).

Furthermore, when, in the above-noted subframe of a predetermined cycle, the number of OFDM symbols which the end subframe information shows is less than a predetermine value (which is, for example, 14, if normal CPs are used), the control section 401 may presume an allocation pattern that is different from the normal CSI-RS/IM allocation patterns (see FIG. 17). This different allocation pattern may be, for example, formed with OFDM symbol #0 to #6 shown in FIG. 17.

The transmission signal generating section 402 generates uplink signals (uplink control signals, uplink data signals, uplink reference signals and so on) based on commands from the control section 401, and outputs these signals to the mapping section 403. The transmission signal generating section 402 can be constituted by a signal generator, a signal generating circuit or a signal generating device that can be described based on common understanding of the technical field to which the present invention pertains.

For example, the transmission signal generating section 402 generates uplink control signals such as delivery acknowledgement signals (HARQ-ACKs), channel state information (CSI) and so on, based on commands from the control section 401. Also, the transmission signal generating section 402 generates uplink data signals based on commands from the control section 401. For example, when a UL grant is included in a downlink control signal that is reported from the radio base station 10, the control section 401 commands the transmission signal generating section 402 to generate an uplink data signal.

The mapping section 403 maps the uplink signals generated in the transmission signal generating section 402 to radio resources based on commands from the control section 401, and output the result to the transmitting/receiving sections 203. The mapping section 403 can be constituted by a mapper, a mapping circuit or a mapping device that can be described based on common understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or a signal processing device that can be described based on common understanding of the technical field to which the present invention pertains. Also, the received signal processing section 404 can constitute the receiving section according to the present invention.

Also, the received signal processing section 404 performs the receiving processes (demapping, demodulation, decoding, etc.) of common control information and unique control information based on commands from the control section 401. To be more specific, the received signal processing section 404 may, for example, demodulate and decode common control information that is communicated in the enhanced PCFICH (first example). Furthermore, the received signal processing section 404 may apply blind decoding to common control information that is allocated in the common search space of an unlicensed band cell or a primary cell, and decode the common control information based on a CRS portion that is descrambled by the unlicensed band cell's RNTI or SI-RNTI (the second and the third example). Also, the received signal processing section 404 may perform the blind decoding of unique control information that is allocated to the user-specific search spaces of an unlicensed band cell or a primary cell.

The received signal processing section 404 output the decoded information that is acquired through the receiving processes to the control section 401. The received signal processing section 404 outputs, for example, broadcast information, system information, RRC signaling, DCI and so on, to the control section 401. Also, the received signal processing section 404 outputs the received signals, the signals after the receiving processes and so on to the measurement section 405.

The measurement section 405 conducts measurements with respect to the received signals. The measurement section 405 can be constituted by a measurer, a measurement circuit or a measurement device that can be described based on common understanding of the technical field to which the present invention pertains.

The measurement section 405 may execute LBT in a carrier where LBT is configured (for example, an unlicensed band) based on commands from the control section 401. The measurement section 405 may output the results of LBT (for example, judgments as to whether the channel state is idle or busy) to the control section 401.

Also, the measurement section 405 may measure the received power (for example, RSRP), the received quality (for example, RSRQ), the channel states and so on of the received signals. For example, the measurement section 405 performs RRM measurements of LAA DRSs. The measurement results may be output to the control section 401.

<Hardware Structure>

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be implemented with one physically-integrated device, or may be implemented by connecting two physically-separate devices via radio or wire and using these multiple devices.

Figure 16:
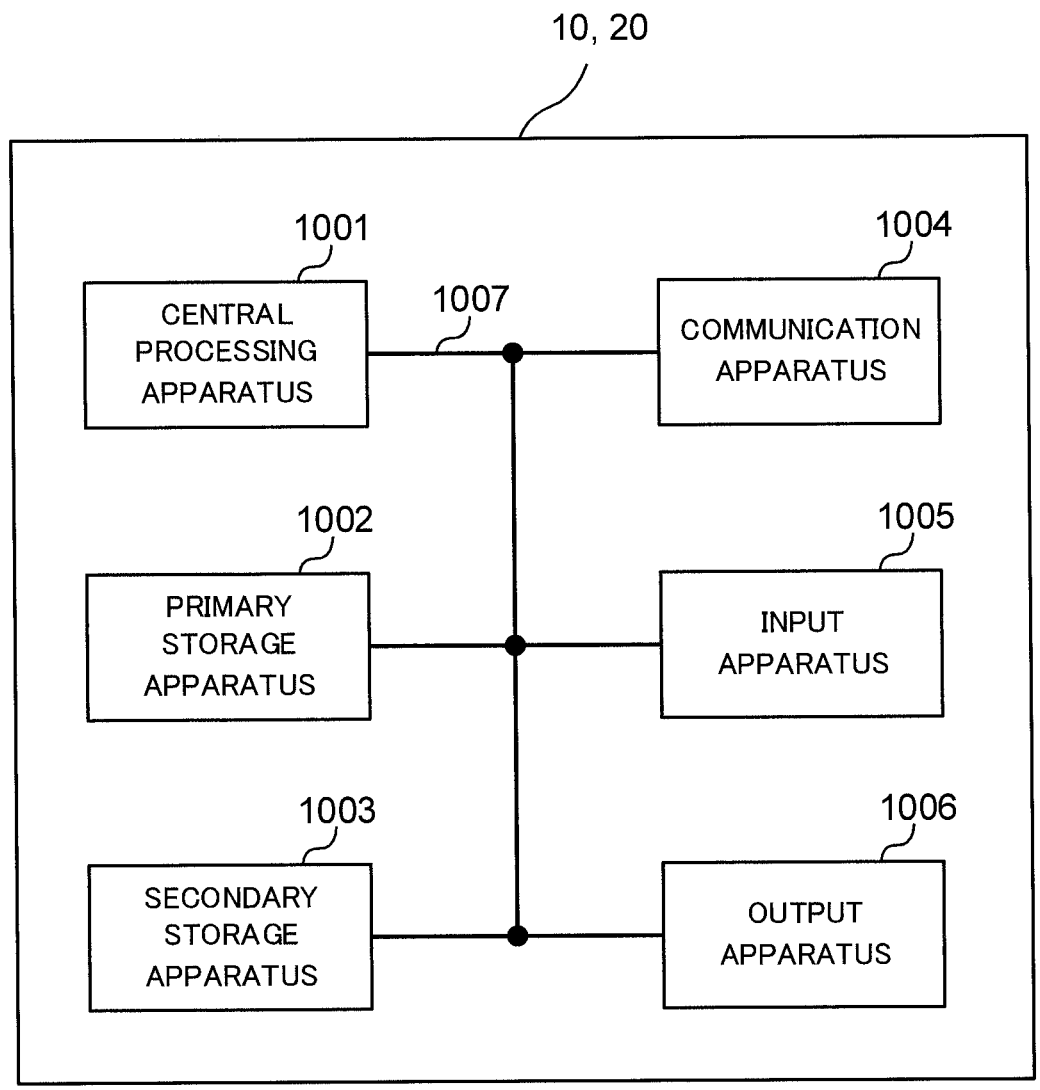
FIG. 16 is a diagram to show an example hardware structure of a radio base station and a user terminal according to the present embodiment.

That is, a radio base station, a user terminal and so on according to an embodiment of the present invention may function as a computer that executes the processes of the radio communication method of the present invention. FIG. 16 is a diagram to show an example hardware structure of a radio base station and a user terminal according to an embodiment of the present invention. Physically, a radio base station 10 and a user terminal 20, which have been described above, may be formed as a computer apparatus that includes a central processing apparatus (processor) 1001, a primary storage apparatus (memory) 1002, a secondary storage apparatus 1003, a communication apparatus 1004, an input apparatus 1005, an output apparatus 1006 and a bus 1007. Note that, in the following description, the word "apparatus" may be replaced by "circuit," "device," "unit" and so on.

Each function of the radio base station 10 and user terminal 20 is implemented by reading predetermined software (programs) on hardware such as the central processing apparatus 1001, the primary storage apparatus 1002 and so on, and controlling the calculations in the central processing apparatus 1001, the communication in the communication apparatus 1004, and the reading and/or writing of data in the primary storage apparatus 1002 and the secondary storage apparatus 1003.

The central processing apparatus 1001 may control the whole computer by, for example, running an operating system. The central processing apparatus 1001 may be formed with a processor (CPU: Central Processing Unit) that includes a control apparatus, a calculation apparatus, a register, interfaces with peripheral apparatus, and so on. For example, the above-described baseband signal process section 104 (204), call processing section 105 and so on may be implemented by the central processing apparatus 1001.

Also, the central processing apparatus 1001 reads programs, software modules, data and so on from the secondary storage apparatus 1003 and/or the communication apparatus 1004, into the primary storage apparatus 1002, and executes various processes in accordance with these. As for the programs, programs to allow the computer to execute at least part of the operations of the above-described embodiment may be used. For example, the control section 401 of the user terminal 20 may be stored in the primary storage apparatus 1002 and implemented by a control program that runs on the central processing apparatus 1001, and other functional blocks may be implemented likewise.

The primary storage apparatus (memory) 1002 is a computer-readable recording medium, and may be constituted by, for example, at least one of a ROM (Read Only Memory), an EPROM (Erasable Programmable ROM), a RAM (Random Access Memory) and so on. The secondary storage apparatus 1003 is a computer-readable recording medium, and may be constituted by, for example, at least one of a flexible disk, an opto-magnetic disk, a CD-ROM (Compact Disc ROM), a hard disk drive and so on.

The communication apparatus 1004 is hardware (transmitting/receiving device) for allowing inter-computer communication by using wired and/or wireless networks, and may be referred to as, for example, a "network device," a "network controller," a "network card," a "communication module" and so on. For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, etc.). The output apparatus 1006 is an output device for allowing sending output to the outside (for example, a display, a speaker, etc.). Note that the input apparatus 1005 and the output apparatus 1006 may be provided in an integrated structure (for example, a touch panel).

Also, the apparatuses, including the central processing apparatus 1001, the primary storage apparatus 1002 and so on, may be connected via a bus 1007 to communicate information with each other. The bus 1007 may be formed with a single bus, or may be formed with buses that vary between the apparatuses. Note that the hardware structure of the radio base station 10 and the user terminal 20 may be designed to include one or more of each apparatus shown in the drawings, or may be designed not to include part of the apparatuses.

For example, the radio base station 10 and the user terminal 20 may be structured to include hardware such as an ASIC (Application-Specific Integrated Circuit), a PLD (Programmable Logic Device), an FPGA (Field Programmable Gate Array) and so on, and part or all of the functional blocks may be implemented by the hardware.

Note that the terminology used in this description and the terminology that is needed to understand this description may be replaced by other terms that convey the same or similar meanings. For example, "channels" and/or "symbols" may be replaced by "signals" (or "signaling"). Also, "signals" may be "messages." Furthermore, "component carriers" (CCs) may be referred to as "cells," "frequency carriers," "carrier frequencies" and so on.

Also, the information and parameters described in this description may be represented in absolute values or in relative values with respect to a predetermined value, or may be represented by using other equivalent pieces of information. For example, radio resources may be specified by predetermined indices.

The information, signals and/or others described in this description may be represented by using a variety of different technologies. For example, data, instructions, commands, information, signals, bits, symbols and chips, all of which may be referenced throughout the description, may be represented by voltages, currents, electromagnetic waves, magnetic fields or particles, optical fields or photons, or any combination of these.

Also, software and commands may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation and microwaves), these wired technologies and/or wireless technologies are also included in the definition of communication media.

The examples/embodiments illustrated in this description may be used individually or in combinations, and the mode of use may be switched depending on the implementation. Also, a report of predetermined information (for example, a report to the effect that "X holds") does not necessarily have to be sent explicitly, and can be sent implicitly (by, for example, not reporting this piece of information).

Reporting of information is by no means limited to the examples/embodiments described in this description, and other methods may be used as well. For example, reporting of information may be implemented by using physical layer signaling (for example, DCI (Downlink Control Information) and UCI (Uplink Control Information)), higher layer signaling (for example, RRC (Radio Resource Control) signaling, broadcast information (MIBs (Master Information Blocks) and SIBs (System Information Blocks)) and MAC (Medium Access Control) signaling and so on), other signals or combinations of these. Also, RRC signaling may be referred to as "RRC messages," and can be, for example, an RRC connection setup message, RRC connection reconfiguration message, and so on.

The examples/embodiments illustrated in this description may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other adequate systems, and/or next-generation systems that are enhanced based on these.

The order of processes, sequences, flowcharts and so on that have been used to describe the examples/embodiments herein may be re-ordered as long as inconsistencies do not arise. For example, although various methods have been illustrated in this description with various components of steps in exemplary orders, the specific orders that illustrated herein are by no means limiting.

Now, although the present invention has been described in detail above, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining example s, and should by no means be construed to limit the present invention in any way.

The disclosures of Japanese Patent Application No. 2015-210954, filed on Oct. 27, 2015, and Japanese Patent Application No. 2015-217391, Nov. 5, 2015, including the specifications, drawings and abstracts, are incorporated herein by reference in their entirety.

The invention claimed is:

1. A terminal comprising:
    a receiver that receives common control information via a downlink control channel in a secondary cell (SCell) in which communication is performed in a spectrum other than a licensed spectrum; and
    a processor that controls a communication process in the SCell based on the common control information,
    wherein, upon detecting that a plurality of subframes belong to different bursts based on the common control information, the processor stops averaging of measurement results of channel state information (CSI) in the plurality of subframes in the SCell, and
    wherein, when the common control information is cyclic redundancy check (CRC) scrambled by using a radio network temporary identifier (RNTI), the processor determines that the common control information includes information regarding a burst length.

2. The terminal according to claim 1, wherein the RNTI is configured by higher layer signaling.

3. The terminal according to claim 1, wherein the common control information is monitored in a common search space.

4. The terminal according to claim 2, wherein the common control information is monitored in a common search space.

5. A radio communication method for a terminal, in a secondary cell (SCell) in which communication is performed in a spectrum other than a licensed spectrum, comprising:
    receiving common control information via a downlink control channel; and
    controlling a communication process in the SCell based on the common control information,
    wherein, upon detecting that a plurality of subframes belong to different bursts based on the common control information, the terminal stops averaging of measurement results of channel state information (CSI) in the plurality of subframes in the SCell, and
    wherein, when the common control information is cyclic redundancy check (CRC) scrambled by using a radio network temporary identifier (RNTI), the terminal determines that the common control information includes information regarding a burst length.

6. A system comprising a terminal and a base station, wherein:
    the terminal comprises:
        a receiver that receives common control information via a downlink control channel in a secondary cell (SCell) in which communication is performed in a spectrum other than a licensed spectrum; and
        a processor that controls a communication process in the SCell based on the common control information, and
    the base station comprises:
        a transmitter that transmits the common control information via the downlink control channel in the SCell,
    wherein, upon detecting that a plurality of subframes belong to different bursts based on the common control information, the processor stops averaging of measurement results of channel state information (CSI) in the plurality of subframes in the SCell, and
    wherein, when the common control information is cyclic redundancy check (CRC) scrambled by using a radio network temporary identifier (RNTI), the processor determines that the common control information includes information regarding a burst length.

* * * * *